(12) United States Patent
Brown

(10) Patent No.: US 9,891,049 B2
(45) Date of Patent: Feb. 13, 2018

(54) METHOD OF SOLVING INITIAL AZIMUTH FOR SURVEY INSTRUMENTS, CAMERAS, AND OTHER DEVICES WITH POSITION AND TILT INFORMATION

(71) Applicant: TRIMBLE NAVIGATION LIMITED, Sunnyvale, CA (US)

(72) Inventor: Troy Lane Brown, Westminster, CO (US)

(73) Assignee: TRIMBLE INC., Sunnyvale, CA (US)

( * ) Notice: Subject to any disclaimer, the term of this patent is extended or adjusted under 35 U.S.C. 154(b) by 342 days.

(21) Appl. No.: 14/926,394

(22) Filed: Oct. 29, 2015

(65) Prior Publication Data

US 2017/0122733 A1    May 4, 2017

(51) Int. Cl.
*G01C 11/04* (2006.01)
*G06T 7/00* (2017.01)
*H04N 5/247* (2006.01)
*H04N 5/232* (2006.01)

(52) U.S. Cl.
CPC ............ *G01C 11/04* (2013.01); *G06T 7/0022* (2013.01); *G06T 7/0042* (2013.01); *H04N 5/23238* (2013.01); *H04N 5/247* (2013.01); *G06T 2207/30181* (2013.01); *G06T 2207/30244* (2013.01)

(58) Field of Classification Search
CPC .... G01C 11/04; H04N 5/23238; H04N 5/247; G06T 7/0022; G06T 7/0042; G06T 2207/30181; G06T 2207/30244
See application file for complete search history.

(56) References Cited

U.S. PATENT DOCUMENTS

| 4,442,432 | A    |   | 4/1984  | Quigley |                  |
|-----------|------|---|---------|---------|------------------|
| 6,804,380 | B1   | * | 10/2004 | Ioannou | ....... G01S 17/89 |
|           |      |   |         |         | 382/103          |
| 2004/0031335 | A1 | * | 2/2004  | Fromme  | ....... G01B 11/24 |
|           |      |   |         |         | 73/865           |

(Continued)

OTHER PUBLICATIONS

International Search Report for International Application No. PCT/US2016/058080, dated Feb. 8, 2017.

*Primary Examiner* — Sath V Perungavoor
*Assistant Examiner* — Howard D Brown, Jr.
(74) *Attorney, Agent, or Firm* — Marsh Fischmann & Breyfogle LLP; Kent A. Lembke

(57) ABSTRACT

A method for solving the initial azimuth for a survey instrument, and other devices, with position and tilt information. The method may be part of bundle adjustment performed during the processing of image and position data collected from each camera of a survey instrument. The use of the initial azimuth generation method (and initial azimuth generator) makes it possible to get accurate azimuth orientation of a camera, such as each camera of a multi-camera survey instrument, without using data from a compass-like sensor. The initial azimuth generated by this method can then be used in later steps/processes of the bundle adjustment to find tie-points with an automatic tie-point finder. Prior to this method, the automatic tie-point finding algorithm relied on the compass and its accuracy, and inaccurate compass values would cause a complete failure, slow runtimes, or less accurate results for the bundle adjustment.

20 Claims, 8 Drawing Sheets

(56) References Cited

U.S. PATENT DOCUMENTS

| | | | |
|---|---|---|---|
| 2006/0221072 A1* | 10/2006 | Se | G01C 11/06 345/420 |
| 2012/0166137 A1* | 6/2012 | Grasser | G01C 15/00 702/150 |
| 2012/0293678 A1* | 11/2012 | Amor Molares | H04N 5/772 348/222.1 |
| 2014/0375773 A1* | 12/2014 | He | G01C 11/06 348/47 |
| 2015/0268043 A1* | 9/2015 | McFadden | G01C 11/04 702/159 |
| 2015/0276402 A1* | 10/2015 | Grasser | G01C 15/06 702/150 |

\* cited by examiner

METHOD OF SOLVING INITIAL AZIMUTH FOR SURVEY INSTRUMENTS, CAMERAS, AND OTHER DEVICES WITH POSITION AND TILT INFORMATION

BACKGROUND

1. Field of the Invention

The present invention generally relates to geospatial data collection with cameras and other devices and, more particularly, to a method and corresponding system for solving for an initial azimuth to assist in processing data sets (e.g., position information and images from one or more cameras) to create geopositional databases allowing accurate measurement of points and objects in three dimensional (3D) space (e.g., determination of 3D locations of objects in a panoramic image captured with a set of panoramic cameras that may be provided as part of a survey instrument or other electronic device).

2. Relevant Background

Traditional surveying may involve operators working with a theodolite and range pole. One operator generally positions the theodolite over a known point while the other operator holds the range pole at a series of points whose locations are to be determined. A target mounted on the range pole is sighted through the theodolite and accurate angular measurements are obtained. Accurate distance measurements may also be obtained using a measuring tape or any other distance measuring device. The locations of the points can be determined using the angular and distance measurements in accordance with known triangulation techniques. Modern surveyors typically use an instrument called a total station, which can be thought of as a theodolite with a built-in laser range finder. Such an instrument is more convenient because distances can be measured directly instead of requiring triangulation techniques or a measuring tape. Surveying with total stations is usually most optimal when the range pole is equipped with a prism to reflect the light from the laser range finder back to the total station. This helps to avoid accidentally measuring to unintentional objects.

In modern satellite-based surveying, an operator may move about with a survey instrument that determines position information using a global navigation satellite system (GNSS). This is typically a GNSS receiver, which may be referred to as the rover. The satellite positioning system most commonly used today is the global positioning system (GPS), although others such as the global orbiting navigation system (GLONASS) are in use or under development. The operator generally moves about a site and stops at various points to record location information determined using signals transmitted by satellite sources to a receiver on the portable survey instrument. Location information is automatically calculated using a differential technique that requires a second GNSS receiver known as the base station to be located at a known position. It collects satellite signals at the same time as the rover. Satellite signals common to both receivers are used to compute a difference or delta vector. When this delta vector is added to the known position of the base station, the rover position is known to a much higher accuracy than a single receiver could accomplish. This can be done in real-time (real-time kinematic (RTK)) or in a post-processing step if more accuracy is needed.

Both traditional and satellite-based surveying are methods of determining location information for points that are typically on the ground or stationary objects. However, for smaller areas, a simple tape measure can also be used. It does not matter for the remainder of this document how these locations are measured.

In photogrammetry-based surveying, an operator may move about a site with a survey instrument that includes one or more cameras. Hereinafter, the term "survey instrument" shall generally refer to this type of instrument. For location information, it may be coupled with a GNSS rover receiver or a prism for a total station to measure. It may have neither, though, and rely on other techniques such as a tape measure, to supply location information. Such an instrument is very similar to a theodolite because it is only capable of measuring angles. One advantage of photogrammetry-based surveying is that it is capable of capturing large amounts of data in a short time, but a disadvantage is that it requires more effort to process the captured data.

The survey instrument may also include tilt sensors that provide information on rotation of the survey instrument (i.e., X and Y rotation) at the time the photographs are gathered by the operator. A compass can also be included in the survey instrument to provide additional instrument orientation information. Multiple cameras are often used with modern survey instruments to increase the amount of image information or photographs captured for a surveyed site. For example, some survey instruments includes a set of cameras (e.g., 7 to 12 cameras or the like) that are used to capture 360-degree digital panoramic images for efficient visual documentation and measurement of the surrounding environment near the survey instrument (e.g., to capture a continuous view about the survey instrument).

The combined information can be used with known photogrammetry techniques to determine 3D coordinates of points. Such techniques often use two or more overlapping or adjacent panoramic images taken from different stations (e.g., different locations). The location and image information can be processed at the site using a controller or may be processed at an office remote from the site using a computer system (e.g., a central server processing the data to create a geodatabase or database populated with geospatial documentation). The image information in the geodatabase can be exported for additional analysis (e.g., to modeling software) and allows for additional measurements to be obtained at any time as long as the additional points or objects are visible in the images.

For a surveyor, the amount of time spent on the job site may mean the difference between profit and loss. With modern survey equipment using photogrammetry techniques, there is little need to return to the field or the site to collect additional data. Instead, the site is completely documented with the 360-degree panoramic images as well as its spatial relationship so that any "missed data" can be quickly and efficiently created from the geodatabase created from data gathered by the survey instrument with its cameras and other sensors (e.g., a position receiver, tilt sensors, and a compass). With the ability to simultaneously capture images and sensor information for the survey instrument, objects at the site or surveyed environment can be quickly located with software at a central site (e.g., at the home office via a network connection to the server running the photogrammetry software). So, the surveyor can not only visualize the surveyed site, but they can also measure it (e.g., selection of a point on an image can result in position information being provided). Stated differently, a point cloud can be generated from the set of collected images along with their position data, and, then, a 3D model can be built from the point cloud.

Survey instruments are just one example of a camera or camera-based device that is equipped with orientation sensors, and when combined with the use of an real time kinematic (RTK) or similar receiver, the position as well as the orientation of each photograph captured by the camera (or each camera of a multi-camera survey instrument) is known or can be determined to a moderate degree of accuracy. With each of these devices, a bundle adjustment is always used as part of the processing of the collected data set to improve the accuracy so, for example, that close-range surveying can be done from the photographs/captured images. The bundle adjustment calculates the pose (position and orientation) for the camera for each image and must have tie-points to work properly or to work at all. A tie-point is a 3D location that is calculated from two or more observations. A tie-point observation is a row and column coordinate on an image that corresponds to a stationary object seen in the image. It also includes a tie-point identification (ID) and image identification (ID).

The bundle adjustment can prove problematic for a number of reasons. As the number of cameras in a device or cluster of images increases, it can become increasingly difficult to find the tie-points. Automatic tie-point finding algorithms have been developed and implemented, and automatic tie-point finding algorithms may deal with this problem by requiring moderately accurate initial positions and orientations. In many camera-based devices, the azimuth component of orientation is measured by an onboard compass or compass sensor. Practically speaking, there is not a better choice than a compass.

Unfortunately, the use of the compass sensor to find the azimuth can cause issues because a typical compass sensor is easily affected by even very small magnetic anomalies resulting in an inaccurate or completely incorrect azimuth value. When instrument locations are measured with a tape measure, the orientation of the coordinates can easily conflict with the compass sensor thus giving the result that the compass appears to be completely incorrect. Then, during the bundle adjustment, the automatic tie-point finder, using these erroneous azimuth values, will fail an unacceptable percentage of the time according to many users of this software. Additionally, the bundle adjustment algorithm can take a long time to run only to determine that the compass error (or azimuth error) is too large for a successful result. In some cases, manual tie-points in an image(s) can be entered or selected by a user/viewer when the automatic tie-point finder fails, but this can be a time consuming process that may need five to eight or more tie-points to detect blunders, and it may take a user an unacceptably long time to enter these manual tie-points, e.g., 20 to 40 minutes in many cases.

Hence, there remains a need for an improved method for determining initial azimuth when processing geospatial data from a camera (e.g., from cameras of a survey instrument) or other electronic device. Preferably, this method would be adapted to overcome the issues that can cause existing bundle adjustment methods (or software modules/routines) to fail by addressing the unreliability of the azimuth information such as that provided by a compass sensor. Generally, position and tilt information are much more reliable than azimuth information so the need is mainly to solve the azimuth. Do so will allow the bundle adjustment to be more efficiently performed as all six of its input values will be reliable, which will greatly improve determinations of camera poses (e.g., calculated positions of the camera are used to override values from the camera or other device's sensors) and will facilitate calculation of a point cloud from images and associated position/orientation data.

SUMMARY

Briefly, a method is described for solving or determining the initial azimuth for a camera with position and tilt sensors. For example, the method may be performed as part of bundle adjustment during the processing of image and position data collected from each camera of a survey instrument. The method may be performed by a processor executing software or executable code (e.g., a processor(s) of a central server managing a geodatabase (or database populated using digital image data and corresponding position (or physical location) data and orientation (or tilt) data generated from the camera's position and tilt sensors) in the form of a geodata analysis module that includes (or calls) a bundle adjustment module, which, in turn, includes or calls an initial azimuth generator to perform more accurate determination of the poses for each camera at the time of data capture.

The use of the initial azimuth generation method (and initial azimuth generator) makes it possible to get accurate azimuth orientation of a camera, such as each camera of a multi-camera survey instrument, without using data from a compass sensor (e.g., without use of compass data). The initial azimuth generated by this method can then be used in later steps/processes of the bundle adjustment to find tie-points automatically (e.g., with an automatic tie-point finder) much faster, more reliable, and more accurate. The taught method is particularly well-suited for use in processing multiple images and data associated with these images (e.g., position data from a GPS or other satellite-based location receiver and orientation data from tilt sensors) because processing of multiple image with prior bundle adjustment software failure (e.g., failure of the automatic tie-point finder). Prior to this method, the automatic tie-point finding algorithm relied on the compass and its accuracy, and inaccurate compass values would cause a complete failure, slow runtimes, or less accurate results for the bundle adjustment.

As will be appreciated by those skilled in the arts, the method provides a significant and desirable improvement as sales of survey equipment, for example, depend on software being able to reliably process the data from the survey equipment (its cameras, position sensors, tilt sensors, and compass). In the past, an ongoing challenge was getting the automatic tie-point finder to work more reliably since it relied on semi-accurate compass readings. Hence, sales are expected to improve with the implementation of the present method (and software modules in the geodata analysis module (e.g., centralized software used to generate and manage a geodata database and, in some cases, build a point cloud from data gathered from the survey instrument)) because sales will no longer be harmed or be at the mercy of the compass accuracy.

More particularly, a method is for processing data from a camera-based device such as a multiple-camera survey instrument with position/location and tilt sensors. The method includes providing a dataset including digital images captured by a camera, position information for the camera (e.g., from a GNSS receiver, total station prism, tape measure, or other position information source) when each of the digital images was captured, and tilt information (e.g., from tilt sensors in the same housing as the camera and position sensor) for the camera when each of the digital images was captured. The method also includes generating a plurality of potential positions for tie-points for the dataset. The method then includes performing arbitration to select a most-likely tie-point position from the plurality of potential tie-point positions associated with an initial tie-point. Further, the method includes generating a plurality of additional tie-points based the most-likely tie-point position of the initial tie-point. Then, the method includes performing bundle adjustment on the dataset using the initial tie-point and the plurality of additional tie-points.

In practicing the method, subsets of the digital images are captured at four or more differing locations in a physical environment (e.g., the images are from four or more stations). For example, in the method, the digital images can be captured at four differing locations in the physical environment (or be associated with four differing stations), and the method may further include receiving a manually or automatically generated tie-point observation for each station to the same point. Then, the step of generating of the plurality of potential positions for the tie-points includes, with the manually or automatically generated tie-point observations as input (hereinafter referred to as generated tie-point observations), applying a four-station-one-tie-point algorithm to the dataset to generate a first subset of the plurality of potential positions for the tie-points. Such an algorithm may include: (a) identifying four cameras that observe the generated tie-point; (b) with an initial pose for each of the four cameras, computing lens position and a direction vector for an observation of the tie-point in a world frame; and (c) creating a hyperbolic cone based on the lens position and the direction vector for each of the four cameras. Then, the first subset of the plurality of potential positions for the tie-points is determined by finding intersections of the hyperbolic cones. In some implementations of the arbitration method, the most-likely tie-point position is a tie-point position that produces an azimuth that most closely matches an azimuth provided by data from a compass sensor associated with the camera. This is so because the 4S1P algorithm cannot resolve ambiguities when the four locations are in a straight line.

In many cases, the digital images are captured at two differing locations in the physical environment (images from at least two stations), and the method further comprises receiving two generated tie-points observations per station to two different points. Then, the step of generating of the plurality of potential positions for the tie-points includes, with the four generated tie-point observations as input, applying a two-station-two-tie-point algorithm to the dataset to generate a second subset of the plurality of potential positions for the tie-points. This may involve: (a) identifying two cameras at two different ones of the locations of the physical environment that were used to capture the digital images that both observe one of the tie-points; (b) with an initial pose for each of the two cameras, computing lens position and a direction vector for an observation of the tie-point in a world frame; (c) creating a hyperbolic cone based on the lens position and the direction vector for each of the two cameras; and (d) repeating steps (a), (b), and (c) for the same two locations but for the second tie-point. Then, the second subset of the plurality of potential positions for the tie-points is determined by finding intersections of the four hyperbolic cones.

DETAILED DESCRIPTION

Figure 1:
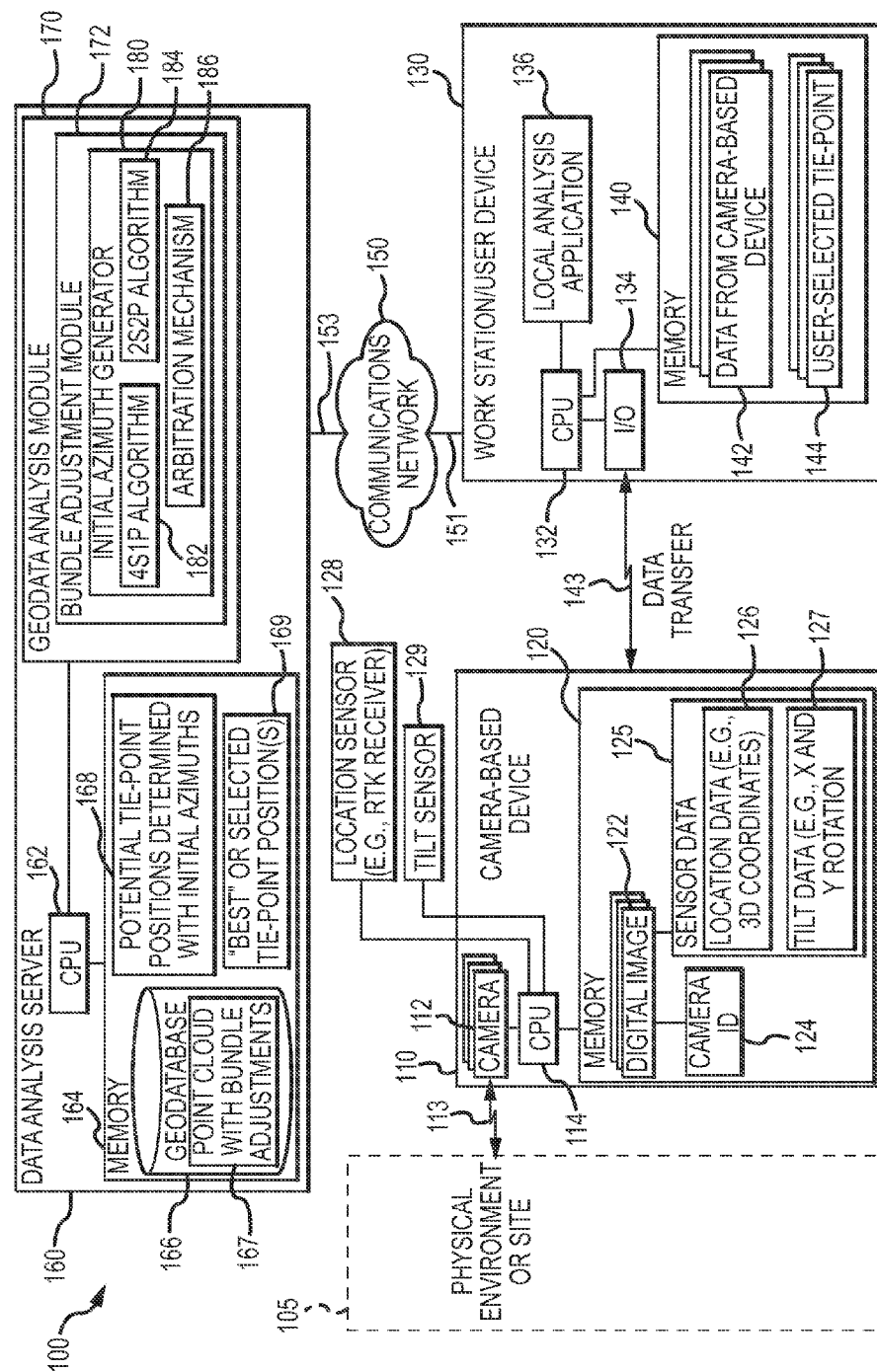
FIG. 1 illustrates with a functional block or schematic drawing a system for implementing the initial azimuth generation method of the present description for data obtained by a camera-based device.

FIG. 1 illustrates a system or network 100 adapted for implementing the method of generating or solving the initial azimuth for camera-based devices (such as survey instruments with multiple cameras, for wireless communication devices with cameras, for portable computing devices with one or more cameras, and the like) that also include sensors or other components useful for determining the physical or spatial location of the device as well as its orientation (or tilt). This allows the data gathered by the camera-based device to be used more effectively using photogrammetry techniques to build a point cloud, which can, in turn, be used for further analysis such as providing a 3D model of a physical environment captured or recorded in digital images obtained with the devices camera or cameras.

As shown, the system 100 includes a camera-based device 110 that is positioned in or near a physical environment or site 105 (e.g., a site that is being surveyed). The device 110 includes one or, more often, multiple cameras 112 and a processor 114 controls operations of the cameras 112 to capture photographs or digital images as shown at 113 of the physical environment 105. The processor 114 functions to store the digital images 122 in memory (or computer-readable media) 120 of the device 110. The device 110 may also include a location or position sensor (or position-determining device) 128, such as a GNSS receiver, a total station prism, or the like (within the device 110 or separately provided), that operates to gather location or position data (e.g., 3D coordinates) of the device 110 in or near the physical site 105), and the processor 114 acts to store sensor data 125 that is linked to each digital image 122 in memory 120. For example, each camera 112 may have an identification (ID) 124 that provided for each image 122 to indicate which camera 112 captured the image 122 and the relative location/position of each camera 112 is known for the device. The sensor data 125 that is stored for each image 122 includes location data (e.g., 3D coordinates) 126 indicating the physical or spatial location of the camera 112 at the time the image 122 was taken and as indicated by the location sensor/receiver 128.

The camera-based device 110 may further include a tilt sensor(s) 129 (within the device housing or separately provided) that functions to determine rotation about two axes (X and Y rotation), and the processor 114 stores this tilt data 127 in memory 120 so that it can be associated with or linked to each image 122. Hence, the sensor data 125 is shown to include five parameters or variables for determining a pose of the camera 112 at the time an image 122 is collected 113 on the physical environment or site 105. The missing parameter or variable is Z-axis rotation or azimuth. As discussed above, the system 100 is configured to calculate or solve for an initial azimuth for the camera 112 without relying on output of a compass or compass sensor such that no compass is shown in as needed in device 110, but, of course, many devices 110 will also include a compass (e.g., it is not a limitation of the present description that the device 110 excludes a compass).

In operation of the system 100, the user of the camera-device 110, such as a survey instrument, takes the device 110 to a location or site 105 and captures data regarding the site 105 with the camera(s) 112 and the location and tilt sensors 128, 129. The image data 122 (and camera ID) and sensor data 125 is stored in memory 120. The user/operator then leaves the site/field environment 105, in most cases, and returns to a location with a work station or user device 130, and the stored data 122, 124, 125 is transferred as shown at 143 to the work station/user device 130. This may be a wired or wireless transfer (or an insertion of a portable memory device with memory 120 into a port of the work station/user device 130) of digital data as is well-known in the industry. The work station/user device 130 may be nearly any portable or less-portable computing device such as a desktop, a laptop, a notebook, a tablet, a smartphone, or the like to practice the system 100. The user device 130 is shown to include a processor 132 that manages operations of input/output devices 134 to receive the data transferred 143 from the camera-based device 110 and to store this data 142 in memory 140 (on the device 130 or accessible by the device 130). The data 142 may include digital images from multiple cameras 112 of a single or multiple camera-based devices 110 and the data 142 may include images and sensor data 122, 125 with the camera-based device 110 in one or more locations or stations in or near the physical environment 105 (e.g., when the device 110 is a survey instrument it typically will be positioned in two to ten or more locations to collect full information on a surveyed site 105).

The processor 132 executes a software program or executable code stored in memory 140 (or non-transitory computer readable media) to provide a local analysis module or application (or app) 136. The local analysis module 136 is configured to provide a user/operator of the user device 130 with an interface to data and functions provides by a geodata analysis module 170 running on a central computing device such as a data analysis server 160. To this end, the user device 130 may be communicatively linked in a wired or wireless manner as shown at 151, 153 via a communications network 130 (e.g., the Internet, a local area network (LAN), a wide area network (WAN), or the like) to the data analysis server 160.

During operation of the user device 130, the local analysis module 136 may act to generate a user interface (e.g., GUI) to allow the user to provide user input to the geodata analysis module 170 and a geodatabase 166 populated and built by the geodata analysis module 170 as well as to a point cloud 167 generated from the camera-based device data 142 by the geodata analysis module 170. Particularly, the local analysis module 136 may query the user/operator of the user device 130 to enter tie-point observations 144 in an image set from the camera-based device data 142, such as by using an I/O device such as a mouse or touchscreen to select a pixel or set of pixels in an image to define a row and column of an image as a tie-point 144. The user-selected tie-point observations 144 are provided to the geodata analysis module 170 for use in performing bundle adjustment, and, more specifically, in solving for initial azimuth as taught in more detail below. In other cases, the tie-point observations 144 may be automatically generated or a combination of manual and automatic may be used.

Briefly, though, the data analysis server 160 includes a processor(s) 162 executing code or running software programs to provide a geodata analysis module 170 and its functions. The server 160 includes memory 164 used to store a data set or geodatabase 166 that the geodata analysis module 170 builds using the camera-based device data 142 provided by the user device 130 to the server 160. Particularly, the geodata analysis module 170 functions to process the digital images and sensor data in the camera-based device data 142 to create a point cloud 167 providing an specific location (X, Y, Z coordinates) for each pixel in the images 122 (e.g., create a measurable panoramic view about each station where the client-based device 110 was positioned during capturing of the images 122). The point cloud 167 is generated in part by performing bundle adjustments on the camera-based device data 142 in the geodatabase 166 and poses of the camera 112 provided by the original camera-based device data 142.

To this end, the geodata analysis module 170 includes a bundle adjustment module 172 to provide bundle adjustments to the collected spatial data. Significantly, the bundle adjustment module 172 is configured to perform bundle adjustments without the need for compass data. Particularly, an initial azimuth generator 180 is included in the bundle adjustment module 172 (or is callable by this module 172) that functions to determine initial azimuths that are used to create lists of potential tie-point positions 168. From these lists of potential tie-point positions 168, the initial azimuth generator 180 acts to choose or determine the most likely (or "best") tie-point position(s) 169. These tie-point positions 169 are then used to complete bundle adjustments by the bundle adjustment module 172, and the more accurate geodata can be used to create the point cloud 167. Beginning with FIG. 3, methods/processes are described that can be performed by the initial azimuth generator 180 such as by calling the four-station-one-tie-point (4S1P) routine or algorithm 182 and/or the two-station-two-tie-point (2S2P) routine or algorithm 184 to generate the lists of potential tie-point positions 168 and by calling the arbitration mechanism 186 to process the potential tie-point positions 168 to determine a "best" or most or more likely reliable tie-point position 169.

Figure 2:
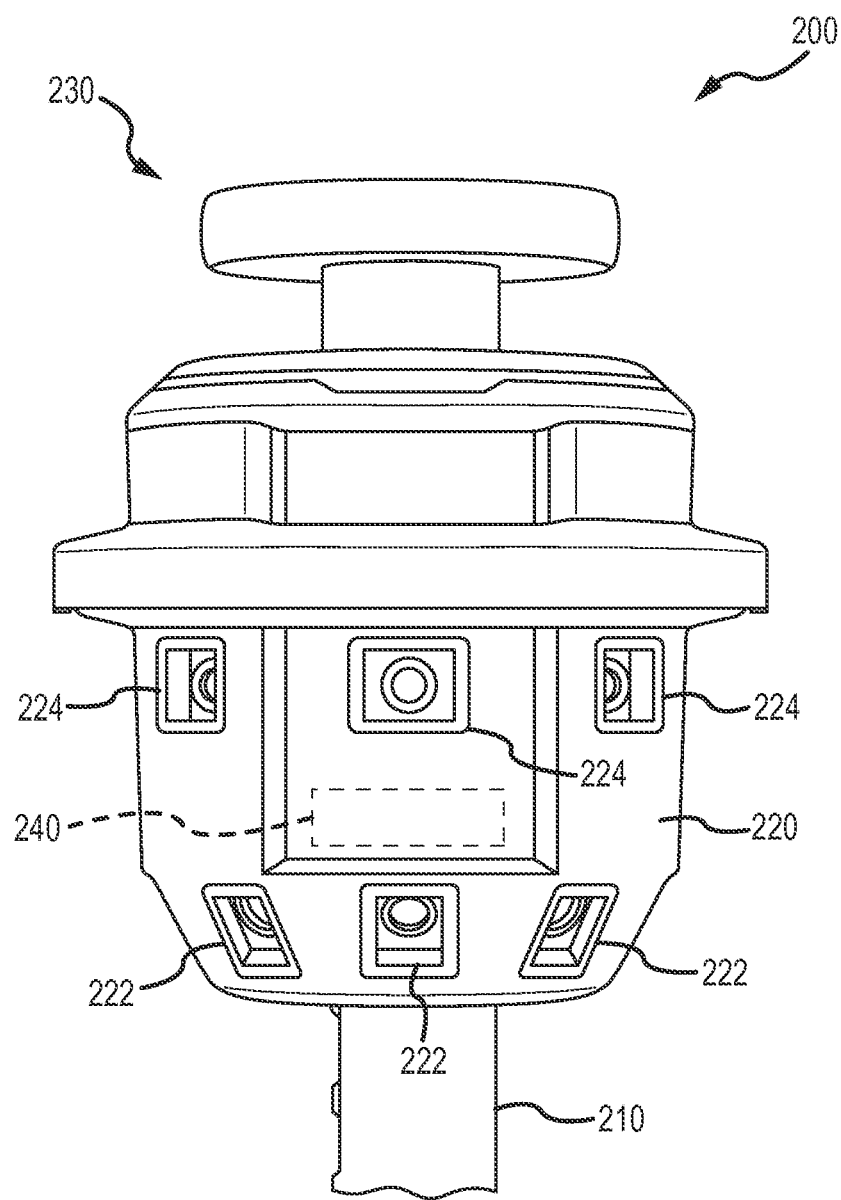
FIG. 2 is a top perspective view of a survey instrument that may be used to implement a camera-based device of the present description such as shown in the system of FIG. 1.

The camera-based device 110 may take many forms to practice the system 100. For example, but not as a limitation, the device 110 may take the form of a multiple camera survey instrument. FIG. 2 illustrates a partial, top perspective view of a survey instrument 200 that may be used for the camera-based device 110 of FIG. 1. As shown, the survey instrument 200 include a support pole or post 210, which is only partially illustrated and would typically be four to six feet in length in practice, and a housing 220 is mounted to the top end of the support pole 210. The housing 220 is configured to house a plurality of cameras adapted to provide a 360-degree, 3D panoramic view of a physical site or environment about the circumference of the housing 220.

To this end, the housing 220 is shown to include a first set of cameras 222 (e.g., 4 to 6 or more digital cameras) that are arranged about the periphery of the housing 220 with their lenses to be downward facing such as to be tilted at an angle (e.g., 15 to 45 degrees) from a longitudinal axis (not shown but readily understood) extending through the support pole 210 and housing 220. Further, a second set of cameras 224 (e.g., 6 to 8 or more digital cameras) that are arranged about the periphery of the housing 220 with their lenses facing substantially perpendicular to the longitudinal axis of the pole 210 and housing 220 (e.g., an axis passing through the lenses of the cameras 224 may be 0 degrees to plus 10 degrees relative to a plane that passes orthogonally through the pole's longitudinal axis). The digital cameras 222, 224 may be operated concurrently to obtain a plurality of images so as to capture a continuous (as field of view of adjacent pairs of the cameras overlap), 3D panoramic image of any environment or space where the survey instrument is positioned (e.g., at any particular survey station). These digital images may be stored in memory, and each image is linked to the camera 222, 224 that captured the image. The relative physical location of each camera 222, 224 in the survey instrument housing 220 is known such that this information can be used to determine the pose of each camera 222, 224.

To further assist with determination of the pose of each camera 222, 224 when images are captured, the survey instrument 200 may include a total station prism or a GNSS receiver (or position-determining device) 230 positioned at a known location on the housing 220 relative to the cameras 222, 224 (e.g., on top of the housing 220 as shown along the longitudinal axis of the housing 220). For example, the receiver 230 may be a RTK, GNSS, GPS, or similar receiver using satellite global positioning data to determine the spatial coordinates of the housing 220 in space and, therefore, the 3D coordinates or spatial location of each of the cameras 222, 224 at the time of the capture of each image (e.g., data collection is time synchronized). When the survey instrument 200 does not include a position-determining device, some other way of determining the ground position can be employed such as a tape measure. Still further, the survey instrument 200 may include one or more tilt sensors 240 configured to determine the rotation of the housing 220 (and, therefore, cameras 222, 224) about two axes, e.g., X and Y rotation. The sensor data may be stored in memory of the device 200, and the image and sensor data can later be transferred or communicated to a user device and/or directly to a central server running geodata analysis software for use in generating a point cloud that can be used in 3D modeling and other analyses. In this manner, the survey instrument 200 functions as a portable data collection device allowing measurable panoramic images to be created (e.g., to support photogrammetry techniques).

With the above systems and devices in mind, it may now be useful to more fully discuss an exemplary method for solving initial azimuth for cameras with position and tilt sensors. This method is useful for generating or finding one or more relatively reliable tie-point positions that can then be used in performing bundle adjustments (which may include use of an automatic tie-point finder to identify additional tie-points for use in the bundle adjustment processes). The method described below can be performed by the system 100 of FIG. 1 such as with the bundle adjustment module 172 with its initial azimuth generator 180 (and this generator's 4S1P algorithm 182, 2S2P algorithm 184, and arbitrator 186). The initial discussion first describes a number of terms and assumptions along with a description of a problem addressed with the initial azimuth generation method and how others have unsuccessfully attempted to address this problem.

A "tie-point" is a photographed, physical point in space with an initially unknown location. A "tie-point observation" is a selected pixel or set of pixels in an image from a digital camera. A "tie-point" can, therefore, be thought of as a collection of tie-point observations to the same physical point from different locations that can be used to compute the location of the tie-point and to compute station poses. A "station" can refer to a collection of one or more images that were taken at the same time and place and usually also includes any position and orientation information that was also collected at the same time and place. A reasonable camera calibration is typically known for each image in the station, e.g., for a survey instrument with twelve cameras such as instrument 200 in FIG. 2 there would be twelve camera calibrations (e.g., known locations and orientations relative to a reference point in a housing of the survey instrument).

In performing spatial or photogrammetry calculations, there are multiple reference frames: (1) the world frame, which is the reference frame in which tie-points and station positions are expressed; (2) the instrument frame, which is the reference frame in which instrument height and external camera calibration parameters are expressed; and (3) the camera frame, which is the reference frame in which detector or sensor coordinates are expressed. A camera calibration is made of external and internal parameters. External parameters describe the pose of the camera in the instrument's frame of reference, and these parameters define a rigid-body transformation to go between the camera and instrument reference frames. Internal parameters describe detector/sensor placement relative to the lens and lens distortion, and these parameters define a transformation between detector/sensor coordinates and direction vectors in the camera reference frame.

The 3D position and 3D rotation angle of a station is called its "pose." The components or parameters that define a station's pose are: X position, Y position, Z position, tilt (X-axis rotation and Y-axis rotation), and azimuth (Z-axis rotation). These parameters define a rigid-body transformation allowing one to go between the instrument and world reference frames. An observation of a tie-point is the combination of a tie-point ID, the station ID the observation of the tie-point comes from, the image it was measured on, and the pixel coordinates (row and column in the image). The tie-point ID is useful because it is used to group observations of tie-points, and, when one refers to a tie-point, they often mean all of the observations with the same tie-point ID. The user of a workstation with a local analysis application and/or access to a geodata analysis module can create manual observations of a tie-point such as by clicking on/selecting the same object (or pixel or pixel group) in multiple images, i.e., the same object in images captured by different stations. Each click or image selection (e.g., in a GUI in which the analysis software is requesting user input to identify tie-points) is an observation. It should be noted that how tie-point observations are created (manually or automatically) is not limiting to the present description and claims that follow this description.

A bundle adjustment is a non-closed-form algorithm, which means it requires good starting values to be effective and, in some cases, to not fail. Bundle adjustments are used to adjust a collection of tie-points and station poses determined from camera (tie-point observations) and sensor data. If the bundle adjustment successfully converges on a solution, the result is improved tie-point positions and/or station poses that can be used to generate a point cloud for use in 3D modeling and other additional processing. In many photogrammetry implementations, the bundle adjustment is one of the first steps or processes performed and, in some cases, is a fundamental part of effective or useful photogrammetry. One of the most difficult parts of a bundle adjustment is to get the initial tie-point positions and station poses. Poor initial values can cause the bundle adjustment to fail or to converge on a local optimum instead of a more preferred and useful global optimum.

One unique aspect of the present method for solving for initial azimuth (and then initial tie-points and station poses)

is that it takes advantage of known position and tilt for a camera-based device to reduce the number of required tie-points to only one or two (rather than some prior approaches requiring many more such as five or more). As will be appreciated by those working with bundle adjustment-based tools, this is a large labor saver when a user has to manually make each tie-point. Further, the method has no convergence issues. The present method is performed under the assumption that the position and tilt are known for each station (each instrument that capture images or each location at which the instrument was used to capture images) via position and tilt sensors or some other method. This information supplies five of the six components of parameters used to determine the initial station pose, and these values are accurate enough to use as initial values in the bundle adjustment.

As discussed above, a problem addressed by the present method is that the sixth component of station pose or azimuth can be supplied by a compass sensor but an azimuth provided by a compass sensor is not always accurate or reliable enough to start a bundle adjustment. This problem with accuracy can be overcome if there are enough tie-points, which can be provided by an automatic tie-point finder algorithm. However, many automatic tie-point finder algorithms also rely on the initial station pose information. In other words, both the bundle adjustment and the automatic tie-point finder are vulnerable to azimuth error introduced by the compass sensor. Hence, if azimuth error is too large, the only known way forward is for the user of these software tools to make numerous (e.g., eight or more) manual tie-points that can be used to overcome the azimuth error. If the user has to make that many tie-points, though, the user really does not need an automatic tie-finder anymore. Users typically are frustrated when they have to provide manual tie-points such that it is highly desirable to provide an alternative method (the method taught herein) that works with the fewest possible manually-selected/created tie-points.

The inventor recognized that if the bundle adjustment could be made immune to azimuth error the user would only be required to input or create three or fewer tie-points (depending on the situation or collected data from the camera-based device) and then it would be possible to use the bundle adjustment to correct any azimuth error. Then, an automatic tie-point finder, which may be part of the geodata analysis module (such as module 170 of FIG. 1), can be called for use in reliably finding additional tie-points to further improve the overall accuracy of the processing (of the photogrammetry process). In some situations, the accuracy provided by bundle adjustment with the initial azimuth provided by the present method may be such that use of the automatic tie-point finder may be eliminated or skipped.

The presently-described method provides a technique to determine accurate initial azimuth with the minimum number of tie-points in a closed-form manner so that the method does not depend on any initial estimates and does not have convergence issues. In understanding the new method, it should be understood that an un-calculated state is one where the azimuth has not yet been calculated. If the azimuth for each station is known, the position of each tie-point can be computed using a simple, closed-form algorithm. Further, if the position of a tie-point becomes known, the azimuth for each station that observes this tie-point can be computed using a simple, closed-form algorithm. This is a mechanism whereby an un-calculated station can become a calculated station if the tie-point is known.

A conventional approach to the problem is to fix the pose of one station at 0, 0, 0 and 0, 0, 0 then solve the relative orientation of a second station using five or more tie-points. The relative orientation is usually a 3D rotation angle and a 2D direction. Some form of artificial scale constraint is applied so the relative orientation can become a 3D rotation angle and a 3D position. Once done, the "bundle" includes these first two stations. A bundle adjustment can be performed on the bundle to minimize error. A third station is then added to the bundle in a similar manner followed by a fourth station and so on until all stations belong to the bundle. Bundle adjustments may be performed at various stages in this process to minimize accumulated error. The final step is to remove the artificial scale constraint and apply a priori information such as known station poses in order to scale, rotate, and translate the bundle into the world reference frame. Once complete, the 3D tie-point positions and station poses are all known. This conventional approach has been implemented by some geodata analysis programs in conjunction with blunder detection. In order to detect blunders, there should be redundancy, which means more tie-points than the minimum are required (e.g., eight or more tie-points).

The conventional solution is very general and works for nearly any combination of a priori information. However, a significant weakness with the conventional solution is the large number of tie-points it requires as input. The presently-described method was generated, in part, as the result of searching for a way to take advantage of the a priori information at an earlier stage so as to reduce the number of tie-points used as input to the bundle adjustment process. Specifically, the method 300 described in FIG. 3 is adapted for use when there are too few tie-points for the conventional method (e.g., less than eight tie-points) and to use one, two or three (e.g., one or two in most cases) manually-entered/created tie-points to solve for initial azimuth, which allows the bundle adjustment to proceed without the need for additional manual creation of tie-points.

Figure 3:
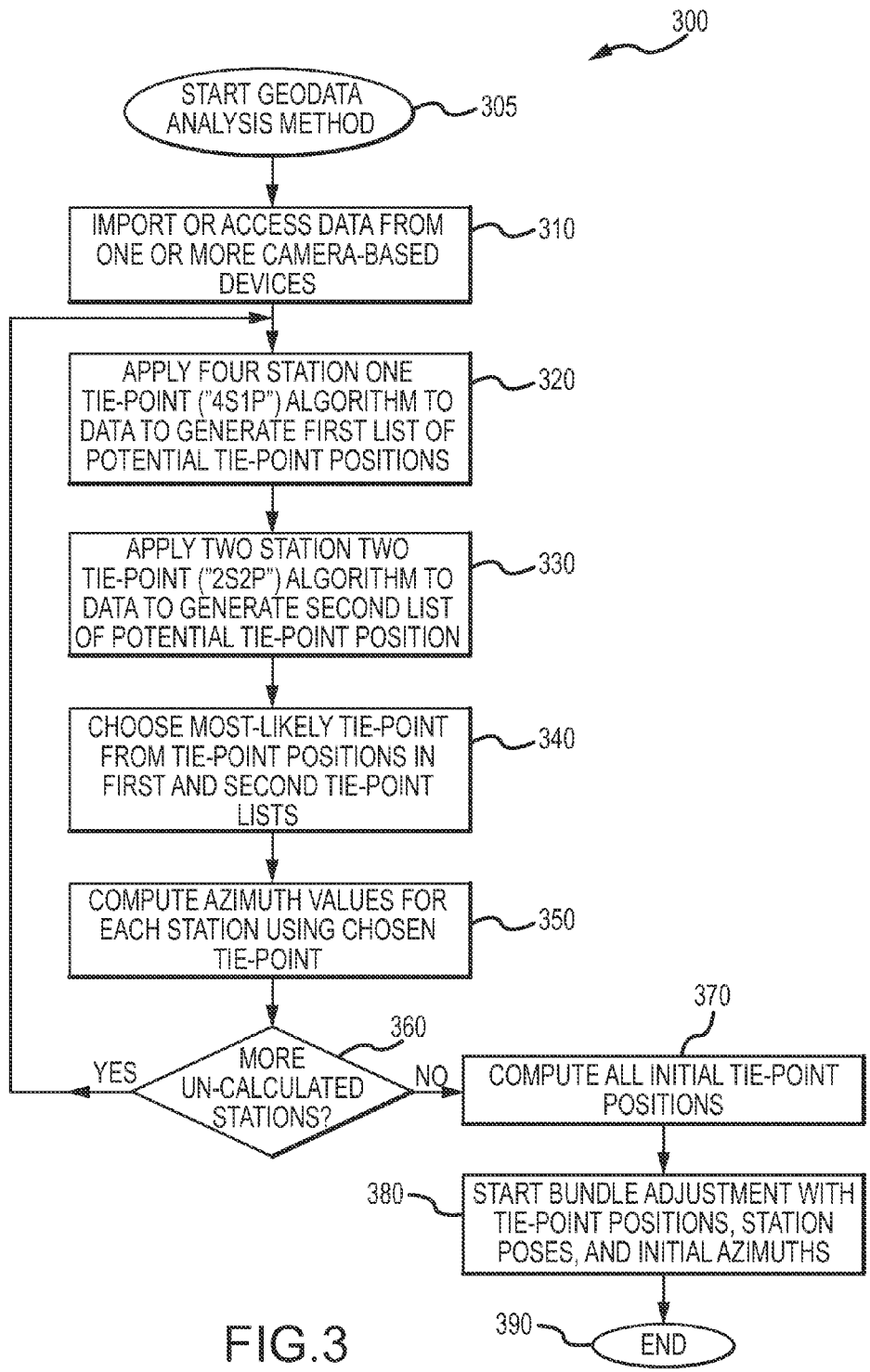
FIG. 3 is a flow diagram or chart of a method of processing geodata or data from a camera-based device (such as a multiple camera survey instrument) including determining initial azimuth values using a small number of tie-points.

FIG. 3 is a flow diagram or chart of a method 300 of processing geodata or data from a camera-based device (such as a multiple camera survey instrument as shown in FIG. 2 or other device used to implement device 100 of FIG. 1) including determining initial azimuth values using a small number of tie-points such as only one or two tie-points. The method 300 may be performed by operation of the system 100 of FIG. 1 such as by the data analysis server 160 running or executing the geodata analysis module 170 with its bundle adjustment module 172 as well as with input (e.g., user-selected (or created) tie-points as shown at 144) from user device 130 running local analysis application 136.

One goal of the method 300 is to find one (or more) accurate or relatively reliable tie-point position without the need for using and/or relying upon data from a compass sensor. In general, the inventor created two algorithms (labeled the 4S1P algorithm and the 2S2P algorithm that are useful for solving for initial azimuth and, hence, tie-point positions implementations where the input/received data from a camera-based device (such as a multiple-camera survey instrument) includes gathered image and sensor data from two stations, three stations, and four stations with one to four tie-points, and it is believed that such cases will cover most practical uses of a geodata analysis module to generate a point cloud (or when bundle adjustment would be utilized).

The method 300 starts at 305 such as with a user transferring data collected from a survey instrument or other camera-based device with position and tilt sensors to their client device and to a central data analysis server running a geodata analysis application or module (or making the data available to the central server). Step 305 may also involve the user interfacing with the central server and the geodata analysis module to initiate processing of the instrument-collected data (e.g., to generate a point cloud for use in 3D modeling or the like). The user typically will be able to indicated which set of collected instrument data in a geo-database managed by the central server is to be processed, and the method 300 may continue at 310 with importing or accessing the data from one or more camera-based devices (e.g., accessing the database in memory local to the central server) such as a survey instrument used to capture panoramic images (and position and tilt sensor data) at a number of positions or stations at a surveyed site (or other physical environment or 3D space).

The method 300 continues at 320 with applying (such as with a bundle adjustment module as shown at 172 of FIG. 1 calling an initial azimuth generator 180 that includes or uses a 4S1P algorithm 182) a four-station-one-tie-point (4S1P) algorithm to the data access or loaded in step 310. The results of step 320 of the method 300 is a generated set or list ("first list") of one, two, or more potential tie-point positions. One exemplary 4S1P algorithm is described in more detail in the following paragraphs (with the numbered items/elements also being considered steps of the algorithm or process).

First, the 4S1P algorithm (or step 320 of method 300) involves finding the tie-point that is observed from the largest number of un-calculated stations (note, before starting the method 300 all stations are considered to be un-calculated). The tie-point should be observed from at least two stations (calculated or uncalculated) and at least one of these stations should be un-calculated. The reason for finding such a tie-point is to find observations that can be used to convert the largest number of un-calculated stations into calculated stations. The benefit is to minimize the number of times the following steps/functions have to be performed.

Second, the 4S1P algorithm involves determining whether the tie-point from the prior step is observed from four or more stations. If so, the 4S1P algorithm should be able to solve/determine the tie-point position, and 4S1P algorithm can proceed with the next (or third step). If not, the 4S1P algorithm skips ahead to the eighth step of the 4S1P algorithm.

Third, for each station that observes the tie-point, the initial station pose is used to compute the lens position and the direction vector of the observation in the world frame. The lens position and direction vector are then used along with the horizontal position of the station pose to create a hyperbolic cone (e.g., to provide the parameters for the hyperbolic cone equation). The initial azimuth value is lost when creating a hyperbolic cone so that it does not matter how much azimuth error (from the compass sensor) there is in the sensor data from step 310.

Fourth, in the 4S1P algorithm, the collection of hyperbolic cones generated or produced in the third step is processed to compute the most likely position of the tie-point. Fifth, in the 4S1P algorithm, the position from the fourth step is determined to be valid or invalid (e.g., a position that is determined to be nonsensical for the stations such as behind the camera lens). If valid, the tie-point is added to the first list (or the 41SP list) of possible or potential tie-point positions. If not valid, the 4S1P algorithm may skip ahead to the seventh step.

Sixth, in the 4S1P algorithm, if the stations that observe the tie-point are located so as to be close to being in a straight line (e.g., a line passes through the station locations or the locations when connected define or nearly define a straight line), there exists a degenerate case where a second position could also be the correct tie-point position. In this straight-line case, the 4S1P algorithm continues with computing the second possible position of the tie-point and adding this second tie-point position to the 41SP list of potential tie-point positions, and an arbitration step (step 340 of method 300) is used later in the method 300 to decide which tie-point position is the best (e.g., most likely to be accurate).

Seventh, the 4S1P algorithm continues by returning to the first 4S1P algorithm step and finding another/different tie-point. In performing the 4S1P algorithm it is preferable to try to avoid using the same stations so as to minimize redundant work. For example, if the tie-point from the first step is observed from uncalculated stations (such as stations 1 through 5), then the next tie-point selection could assume that these uncalculated stations (stations 1 through 5 in this example) have now been calculated so the 4S1P algorithm finds a tie-point observed from different, un-calculated stations. If another tie-point cannot be found, this indicates to the 4S1P algorithm that all un-calculated stations have been dealt with, and 4S1P algorithm can end (and the method 300 can continue with step 330).

The method 300 continues at 340 with applying (such as with a bundle adjustment module as shown at 172 of FIG. 1 calling an initial azimuth generator 180 that includes or uses a 2S2P algorithm 184) a two-station-two-tie-point (2S2P) algorithm to the data access or loaded in step 310. The results of step 330 of the method 300 is a generated set or list ("second list") of one, two, or more potential tie-point positions. One exemplary 2S2P algorithm is described in more detail in the following paragraphs (with the numbered items/elements also being considered steps of the algorithm or process).

First, in performing the 2S2P algorithm, clusters of observations are built where there are at least two stations observing two tie-points. This may be achieved by starting with the tie-points that are observed from the largest number of un-calculated stations and working toward the tie-points that are observed from the least number of un-calculated stations. For example, the 2S2P may build two dimensional arrays where the row dimension is the station ID and the column dimension is the tie-point ID. Each cell represents an observation from the station associated with the row to the tie-point associated with the column. A cell is left blank if there is no observation by the row station to the column tie-point. Limits can be placed on the maximum dimensions for these arrays because the number of tie-points might be quite large. By starting with the tie-points observed from the largest number of un-calculated stations, it means that if an array gets filled up, it will contain the more important observations and the less important observations will not find room in the arrays.

Second, the 2S2P algorithm includes computing the most-likely positions of each tie-point in the column direction based on the hyperbolic cones created from each of the arrays. Such position computing is performed for each array generated in the first 2S2P step. Third, the 2S2P algorithm continues with adding the tie-point position to a second or 2S2P list of potential tie-point positions each valid tie-point position identified in the second 2S2P algorithm. When all arrays are processed, the 2S2P algorithm can halt (step 330 of method 300 is completed), and the method 300 may continue with step 340.

Step 340 may be thought of as or labeled "the arbitration step" and involves choosing the most-likely tie-point in the combination of the first and second lists of potential tie-points generated in steps 320 and 330. This step 340 may be carried out by the arbitration mechanism 186 shown in the system 100 of FIG. 1. Arbitration is performed to process the two lists of potential tie-point positions to select a best choice or most-likely accurate tie-point position, and such arbitration may be performed in any of a number of ways. For example, if there are only two possible tie-point positions and the 41SP algorithm detected the degenerate case, the arbitration step 340 may involve choosing the tie-point position that is most synergistic with the compass, e.g., choose the tie-point that requires the smallest angle change to go from the initial compass-defined azimuth to the corrected azimuth.

If there are more than two possible tie-point positions in the combination of the first and second lists or the 41SP algorithm did not detect the degenerate case, a temporary azimuth value may be computed for each station that observes it for each of the possible tie-point positions on the two lists. Then, using all possible observations from these stations, arbitration at 340 may involve counting the number of tie-point positions that can be computed. For each of these positions, the residuals may be determined for the observations to the tie-point. Then, arbitration at 34 may include choosing the best possible tie-point position according to the following: (a) one possible tie-point position is better than another if its count is higher; and (b) if counts are equal, one possible tie-point position is better than another if the residuals are lower.

The method 300 continues at 350 with computing azimuth values for each station using the tie-point position chosen in step 340. Typically, step 350 will involve, using the chosen tie-point, computing final azimuth values for each station that observes it. Then, these stations can be marked or identified as computed or calculated. The method 300 then continues at 360 with a determination of whether or not there are additional un-calculated stations to be processed. If yes, the method 300 continues with repeating step 320. If not, the method 300 continues at 370 with computing all initial tie-point positions. This may involve using the station poses with the azimuth values that were computed (solved initial azimuths) to compute all initial tie-point positions. Next, the method 300 continues at 380 with starting bundle adjustment with the computed initial tie-positions (and, as needed for the bundle adjustments the station poses and solved initial azimuths. The method 300 then may end at 390 or processing may continue such as with generating a point cloud with results of the bundle adjustment.

With the method 300 in mind, the following discussion provided further details on how to implement the 4S1P and 2S2P algorithms and provide, with reference to graphs, further explanation of the workings of these algorithms to solve initial azimuth. Turning first to the 4S1P algorithm, the user makes a minimal number of manual tie-points. A manual tie-point may be an ID plus one click per image in which the same object can be seen. For example, a user may find a nearby object that can be seen from each station, and then one tie-point may do for the algorithm. If this is not possible, the user may have to make two tie-points where some of the stations observe one and the remaining stations observe the other one (with or without overlap). If even this is not possible, the user may be have to make three or more tie-points. Further, for the 4S1P algorithm, there should be a minimum of four stations that observe the same tie-point with an epipolar line that is more than 1 degree from the horizontal (with more stations being even more preferable). This is another way of saying that the tie-point should not have the same elevation as the camera. Additionally, it is typically preferable that there not be a lot of error in the position and tilt information that comes from the sensors. For example, locations or positions measured with an RTK receiver or the like under a canopy or too near a building may introduce unacceptable vertical error due to multi-path reflections. If this is the case, the minimum number of stations observing a tie-point should be even higher (e.g., eight or more stations).

Figure 4:
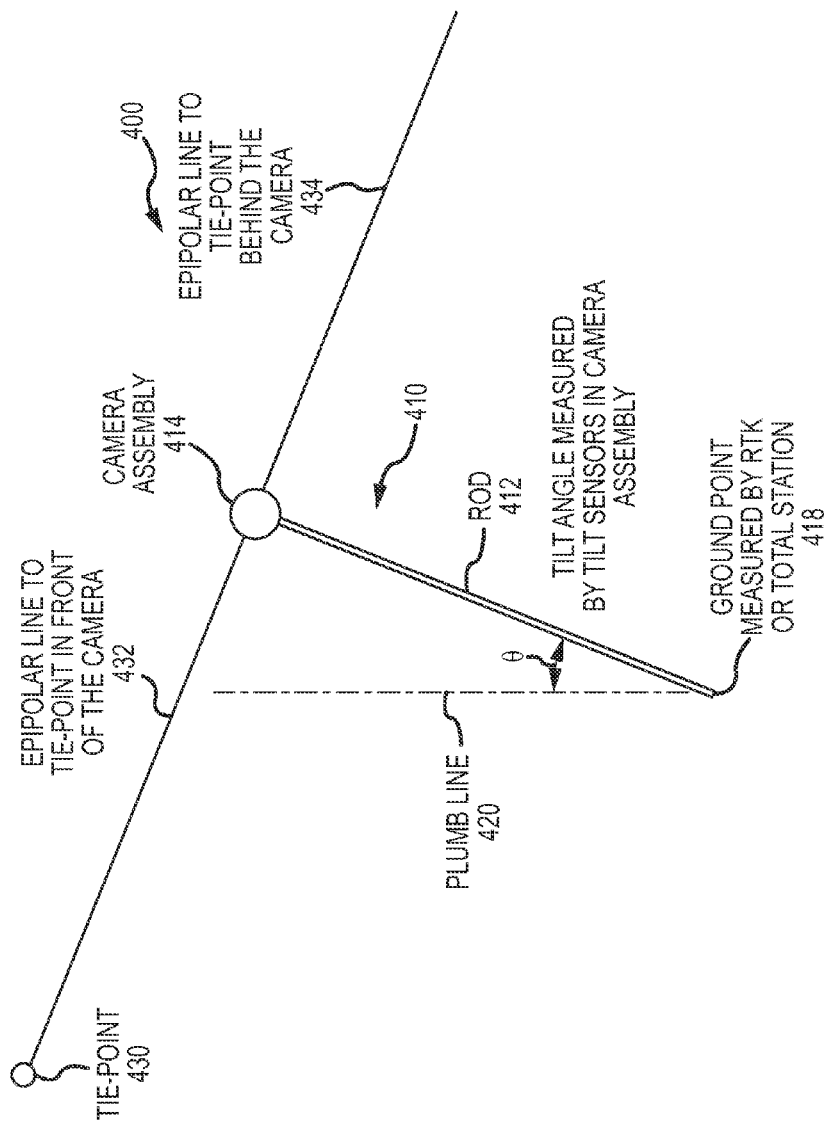
FIGS. 4-8 illustrate with graphs or schematic drawings processes carried out during performance of the 4S1P algorithm.

FIG. 4 illustrates a schematic or graph of a process 400 of identifying a tie point 430 relative to a camera-based device (such as survey instrument) 410. The device 410 includes a support rod 412 (e.g., a rod that is 2 meters in length) and a camera head assembly 414 that includes a plurality of digital cameras for obtaining panoramic views about the assembly 414 and also includes position sensor (e.g., RTK receiver) and tilt sensors. As shown, a ground point 418 is measured for the device 410 such as by the RTK receiver or other position sensor, and a tilt angle, $\theta$, is measured by the tilt sensors between a plumb line 420 and the support rod 412. A tie-point 430 is selected (e.g., by a user), and, as a result, epipolar lines 432, 434 are defined to the tie-point 430 in front of the camera and to the tie-point 430 behind the camera.

Figure 5:
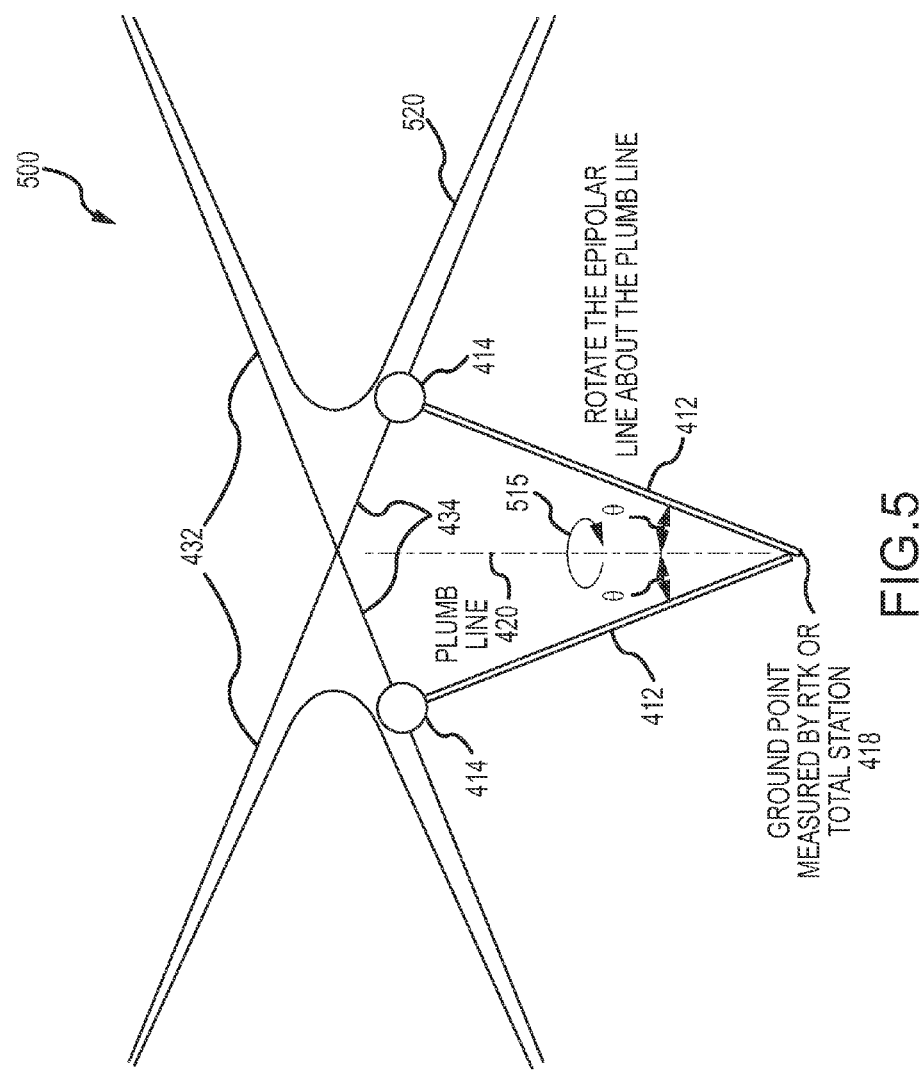

With regard to FIG. 4, if one thinks of the epipolar line 432, 434 originating at the lens and going through the tie-point 430 as a line that also goes away from the tie-point through the back of the camera one can rotate, as shown with arrow 515 in FIG. 5, that line about a vertical line 420 through the point on the ground. This describes a hyperbolic cone 520 whose surface represents all the possible tie-point positions both in front of the camera (realistic or "valid") and behind (non-realistic or "invalid"), and this can be seen in graph or schematic 500 of FIG. 5. By rotating 515, this line 432, 434 about the vertical or plumb line 420, it is the same as saying that the azimuth to the tie-point is unknown. The more tilted (the larger the angle, $\theta$) the instrument is when a panorama of images is taken with the cameras of the assembly 414, the greater the radius at the vertex.

The horizontal position of the vertex is defined by the horizontal position of the ground point 418. The vertical position of the vertex is defined by the closest point on the vertical line 420 and the epipolar line 432, 434 as shown in FIG. 4. The radius of the vertex is defined by the closest distance between the vertical line 420 and the epipolar line 432, 434 of the graph 400 of FIG. 4. The slope of the cone far from the vertex is defined by the vertical slope of the epipolar line 432, 434.

Figure 6:
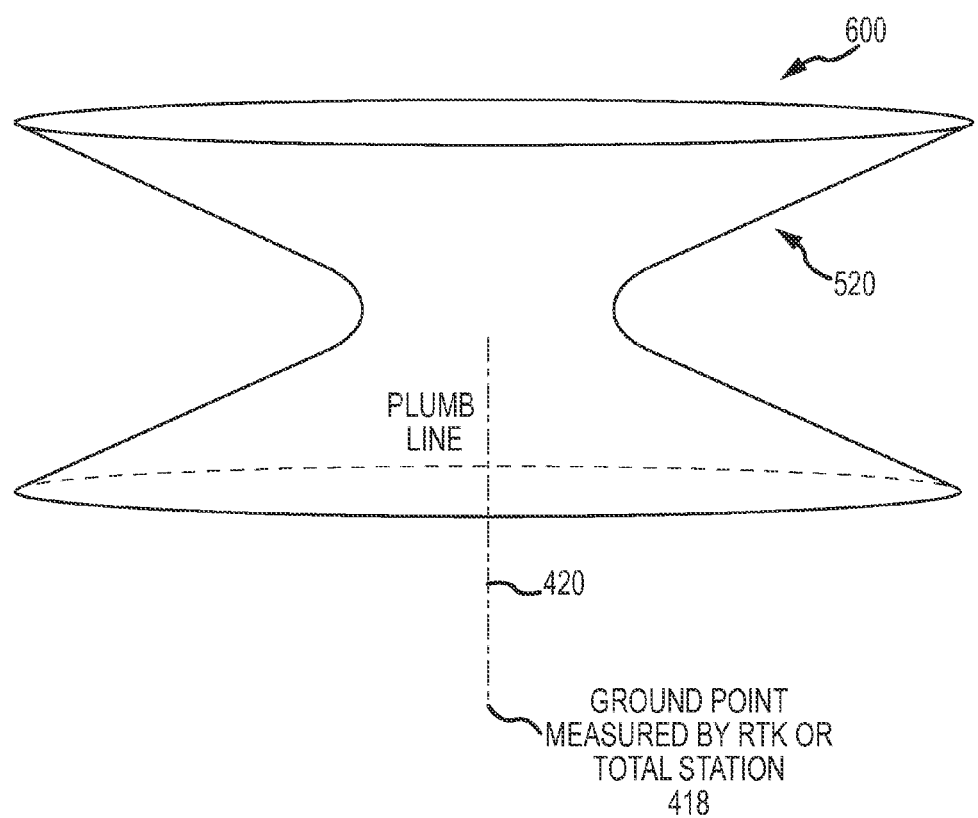
Figure 7:
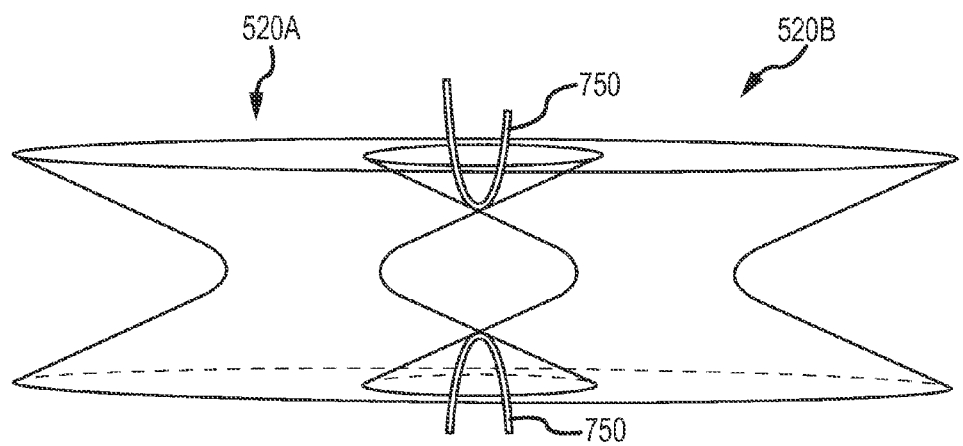
Figure 8:
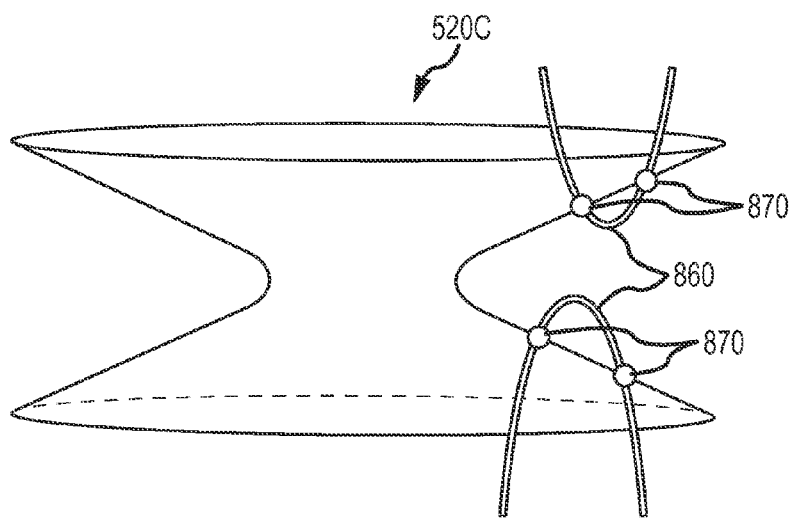

FIG. 6 illustrates with graph or schematic 600 in more detail the hyperbolic cone 520 that can be used to represent each tie-point observation. The surface of the cone 520 represents all possible positions of the tie-point when the distance and the azimuth to the tie-point are not known. Half of these positions will be in front of the camera and half will be behind the camera (non-realistic tie-point positions). As shown in FIG. 7, the intersection 750 of two such cones 520A, 520B produces two curves. The points on both curves 520A and 520B represent all possible tie-point positions that simultaneously satisfy both tie-point observations. As shown in FIG. 8, the intersection 860 of a third cone with the two curves 520A and 520B produces up to four points 870. These points 870 represent all possible tie-point positions that simultaneously satisfy all three tie-point observations. Some of these points 870 will be behind one or more camera lenses, and these points 870 are, therefore, not realistic and can be eliminated from the 4S1P list of possible tie-point positions.

Although not shown in the figures, one or more additional cones may be used to resolve the ambiguity. This can be done in such a way as to also implement a simple form of outlier detection, which is described in the following steps. First, given a collection of such hyperbolic cones (one per station), many combinations of three cones can each be used to solve their respective intersection points. In most cases, there are two points of intersection that lie in front of the cameras. This can be done in a closed form algorithm (no iteration and no initial guess) developed for this purpose. Second, for each intersection point from each combination of three cones, the vertical residual is measured for all cones in the collection, and a list of cones is built whose residuals are less than three times the expected vertical standard error. These are the inliers associated with that particular intersection point. Also, for each intersection point, the sum of the residuals is computed.

Third, for all intersection points, the intersection point is found with the most inliers. If two intersection points have the same number of inliers, the sum of residuals may be used to decide which of the two intersections is better. Fourth, an optional weighted least squares iterative routine may be used to improve on the position of the tie-point. Cones with a large residual are given a lower weight and cones with a slope near 0, 90, and 180 degrees are also given a lower weight because they do not contribute as much to the final solution. This is similar to the iteratively re-weighted least squares (IRLS) algorithm, which is popular for use in detecting outliers. Fifth, once the tie-point position has been computed, a rotation angle is determined for each station so that in the plan view the epipolar lines all intersect at the tie-point position. This rotation angle corrects any initial azimuth error. The epipolar lines may not all intersect vertically but, unless the error is extreme, an automatic tie-point finder should still work with the results of this method (e.g., an initial tie-point) as its input.

Further with regard to the 4S1P algorithm, it may be useful to understand that the algorithm solves the intersection of three hyperbolic cones and uses a fourth cone (or more in some cases) to resolve the ambiguities. If there are more than four cones, a crude form of outlier detection can be used to make the algorithm more robust. At the risk of repetition, the following are exemplary steps or functions that may be carried out by software and hardware (such as by the 4S1P algorithm 182 of a bundle adjustment module 172 shown in FIG. 1) to solve for initial azimuth for a camera with position and tilt sensors.

First, in an implementation of a 4S1P algorithm, all hyperbolic cones may be offset by subtracting the vertex position of one of the cones from all vertices (e.g., "the centroid" even though this is not quite mathematically correct). This helps to reduce round-off error because the magnitude of the numbers is small, and it also simplifies the math if one cone can be at 0, 0, 0. Second, the hyperbolic cones are sorted according to the slope. Cones with slopes near 45 degrees are the most useful while cones near 0 and 90 degrees are the least useful, and this may be thought of as "the usefulness factor." The most useful cones are put at the top of the sorted list so that they are the first to be used. Cones with a high usefulness factor help to reduce round-off error and to make the 4S1P algorithm less vulnerable to error in the cone parameters.

Third, a list of combinations of three cones is created. The cones involved may be limited to the ten (or some other number) most useful cones, which is one reason they are sorted in the previous step. For example, the maximum number of combinations occurs if there are ten or more cones, then there would be (10−1)*(10−2)/2 or 36 combinations of 3. Fourth, one of the combinations of three cones is chosen, and it is determined whether these "seed" cones are nearly in a straight line. If they are, one set of equations is used to solve the two possible intersection points of the three cones. If not, another set of equations is used to solve the four possible intersection points of the three cones. All possible intersection points are placed into a set or on a list.

Fifth, in the 4S1P algorithm, points are eliminated from the list that are not realistic with regard to the physics of the environment and capturing camera assembly. For example, if the direction vector used to determine the slope of a hyperbolic cone slopes upward but the intersection point is below the cone's vertex, then the solution (tie-point position) essentially lies behind the camera and is not realistic such that this tie-point position can be deleted from the list of potential tie-point positions. Sixth, for each realistic intersection point, the residual is computed for all the hyperbolic cones. Residual is the elevation of the point minus the elevation of a hyperbolic cone at the horizontal position of the point. Cones with a residual less than some course threshold are considered inliers, and those with a residual greater than the threshold shall be considered outliers. In other words, for each intersection point, the cones are determined that appear to be in consensus with the three seed cones.

Seventh, for each realistic intersection point, the cones are processed that are in consensus with the three seed cones and a quality metric is computed (such as the average residual). The union of the intersection point and the quality metric is a solution, and all solutions found are put on a master list such that the "best" one can be chosen below in the ninth step. Eighth, as long as there are more combinations of three, the 4S1P algorithm continues by returning to the fourth step. Ninth, the 4S1P algorithm continues with searching the solutions in the master list to find the one solution with the best quality metric (e.g., lowest residual). Tenth, optionally a least squares algorithm may be applied to refine the best solution using all inlier cones. Eleventh, the intersection point associated with the best solution is chosen and the original vertex position of the 0, 0, 0 cone is added back in. Then, this sum can be returned or output as the final value or most likely tie-point position.

Further with regard to the 2S2P algorithm, it may be useful to understand that the algorithm is designed to find a point on the intersection curve of two hyperbolic cones that is a fixed horizontal angle from the intersection point on the intersection curve of two other hyperbolic cones. The two points are the positions of the two tie-points. Prior to turning to exemplary steps of the 2S2P algorithm, it may be helpful for the reader to visualize the input data as a two-dimensional array of hyperbolic cones. Each hyperbolic cone in a row represents an observation to a different tie-point from the same station such that the row index is like a station index. Each hyperbolic cone in a column represents an observation to the same tie-point from different stations such that the column index is like tie-point index. A blank cell in the array indicates that there is no observation from the station associated with the row to the tie-point associated with the column. Although the minimum numbers for the 2S2P algorithm is two stations (rows) and two tie-points (columns), more of each may be utilized during performance of the algorithm. The redundancy helps to avoid ambiguous solutions, but too much redundancy can be detrimental such that it may be useful to provide size limits for the array of cones.

The following are exemplary steps or functions that may be carried out by software and hardware (such as by the 2S2P algorithm 184 of a bundle adjustment module 172 shown in FIG. 1) to solve for initial azimuth for a camera with position and tilt sensors (and provide a most-likely or sets of more likely tie-points).

First, in an implementation of a 2S2P algorithm, a limited exhaustive search is performed using all combinations of stations taken two at a time (or paired) and combinations of tie-points also taken two at a time (or in pairs). This is one reason why it may be beneficial to provide limits on the array of cones to avoid a calculation time that is undesirably large, which may be the case if there are many stations and/or tie-points provided as input to the algorithm. The number of combinations is given by $n(n-1)/2 * m(m-1)/2$, where n is the number of stations (number of rows) and m is the number of tie-points (number of columns). For two stations and two tie-points, there is only one combination but for as little as five stations and five tie-points there are one hundred combinations. As the number of stations and tie-points increases, there is a diminishing advantage and an increasing calculation cost so that smaller limits in array size are desirable (e.g., less than about eight stations and less than about 12 tie-points).

Second, in the 2S2P algorithm, one of the combinations from the first step is selected. If this combination does not have all four cones defined, the algorithm returns to the first step and a different one of the combinations is selected for processing. If there are no more combinations to process, the algorithm skips or goes to the eleventh step discussed below.

A third step of the 2S2P algorithm may be thought of as a parameter or variable identification/labeling step. The first station in the selected combination may be referred to as Station 1 and the second station in the combination as Station 2. Similarly, the first and second tie-points may be referred to as Point A and Point B, respectively. The cone for Station 1 observing Point A may then be referred to as Cone 1. The cone for Station 2 observing Point A may be referred to as Cone 2. The cone for Station 1 observing Point B may be referred to as Cone 3, and the cone for Station 2 observing Point B can be referred to as Cone 4. Note, Cones 1 and 3 share the same horizontal position but not necessarily the same vertical position. Similarly, Cones 3 and 4 share the same horizontal position but not necessarily the same vertical position. Vertical positions can differ because of lens placement and tilt angles.

In a fourth step, all four cones are offset and rotated by a rigid-body transformation that places Cone 1 at 0, 0, 0 and Cones 2 and 4 on the Y-axis (the X-axis could also be used, though). This is done for two reasons: (1) it reduces the size of the numbers, which improves round-off error; and (2) it simplifies the equations. This transformation is reversed in a later step of the algorithm (i.e., in the ninth step discussed below).

In a fifth step of the 2S2P algorithm, the intersection of Cones 1 and 2 is determined. This can be referred to as Curve A, and it represents all possible positions of Point A (or a first possible or potential tie-point position to be added to the list for the 2S2P algorithm). Then, the intersection of Cones 3 and 4 is determined, and this is referred to as Curve B, which represents all possible positions of Point B (or a second tie-point output by the 2S2P algorithm). Both curves are symmetrical about the Y-axis. The curves also represent possible positions of tie-points that lie behind the cameras such that care should be taken to only use the portions of the curves that provide realistic or "valid" tie-point positions for a survey instrument or other camera-based device.

As part of the sixth step of the algorithm, one can consider or look at the horizontal part of the direction vectors from Station 1 to Points A and B. It will become clear that there is a fixed angle difference between the vectors and there is an intersection point that is fixed in the instrument reference frame. This angle and intersection point can be labeled Relationship 1 because it comes from Station 1. Similarly, there is a Relationship 2 that describes the relationship of the observations from Station 2 to Points A and B. These two determined/identified relationships can be manipulated so as to reduce to a single angle for each one. Therefore, it is useful to consider Relationships 1 and 2 as being fixed angles between observations.

Seventh, in the 2S2P algorithm, points on Curve A and Curve B are found that simultaneously satisfy Relationships 1 and 2. The positions on Curve A are the possible positions for Point A and the positions on Curve B are the possible positions of Point B. While computing this step of the algorithm, points are rejected that are not realistic with the physics of the image-capturing instrument.

Eighth, the algorithm proceeds with using each one of the possible positions of Point A and the relationships with other tie-points to compute all other tie-points and their residuals. Physically non-realistic solutions are rejected. The residuals are averaged to form a quality metric. In this eighth step, if there are only two tie-points, a residual cannot be calculated (or it would always be zero). This residual is useful because it is a quality metric that can be used to identify the best solution out of several possible solutions. Note, there may not be any solution at all, which can happen if one or both of the stations has too much error. Also, it will be understood that there may be multiple solutions.

Ninth, in the 2S2P algorithm, the rigid-body transformation applied in the fourth step is reversed for all positions found in the prior or eight step of the algorithm. Then, these potential tie-point positions are stored in memory (along with the residual) as a solution that are added to the list of possible tie-point positions (or list or set of solutions). Tenth, as long as there are more combinations, the algorithm returns back to the second step upon completion of the ninth step.

Eleventh, the 2S2P algorithm is configured to recognize that for those situations where there are only two tie-points residuals cannot be computed (in the eight step of the algorithm). For this situation, a different quality metric is computed. All combinations of stations are explored so that each station gets tried the same number of times (i.e., n−1 times). To this end, the number of times a station is part of a solution is counted or tracked. Outlier stations will tend to get a low count, and inlier stations will tend to get a high count. Each solution involves two stations so the quality metric for a solution can be defined as the sum of the count for Station 1 and Station 2. Solutions that use inlier stations will have a higher quality metric than solutions using outliers. Therefore, the best solution is typically the one with the highest quality count. As a final or twelfth step, the best solutions from the prior or eleventh step with two or more tie-points are identified and returned as the output or results of the 2S2P algorithm as a list or set of potential tie-point positions.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

To provide further explanation of how the initial azimuth solving processes of the present description may be implemented, it may be useful to provide techniques for deriving the 2S2P and 4S1P algorithms beginning with the 4S1P algorithm.

The following derivation is for the 4-station-1-point algorithm. It uses the intersection of 3 cones to solve the position of up to 4 intersection points, usually 2. The 4th cone is used to resolve ambiguity and reduce the number of intersection points to hopefully just 1 point. There are two forms of this. The first is a degenerate case where (normalizedDeterminant<thresholdForDegenerateCase) that occurs when the cones are in nearly a straight line. The derivation for this form begins with the phrase "If D is very small". The derivation for the other, more general form, begins with the phrase "If D is large".

Derivation of the 4-station-1-point algorithm: Given equations for 3 vertical hyperbolic cones, find the intersection point x, y and z $$(x-X1)^2+(y-Y1)^2=(M1(z-Z1))^2+R1^2$$

$$(x-X2)^2+(y-Y2)^2=(M2(z-Z2))^2+R2^2$$

$$(x-X3)^2+(y-Y3)^2=(M3(z-Z3))^2+R3^2$$

where Xn, Yn and Zn (not x, y and z) specify the vertex position of cone n and where Mn specifies the slope of cone n (delta horizontal/delta vertical) and where Rn specifies the radius of the vertex. If Rn is zero, the cone simplifies to the traditional one.

First, we move to the origin to the vertex of cone 2:

$$x1=X1-X2$$

$$y1=Y1-Y2$$

$$z1=Z1-Z2$$

$$x2=0$$

$$y2=0$$

$$z2=0$$

$$x3=X3-X2$$

$$y3=Y3-Y2$$

$$z3=Z3-Z2$$

Make the substitution and simplify:

$$(x-x1)^2+(y-y1)^2=(M1(z-z1))^2+R1^2$$

$$x^2+y^2=(M2(z-z2))^2+R2^2$$

$$(x-x3)^2+(y-y3)^2=(M3(z-z3))^2+R3^2$$

Expand the right side:

$$(x-x1)^2+(y-y1)^2=M1^2z^2-2M1^2z1z+M1^2z1^2+R1^2 \quad \text{EQ. 1}$$

$$x^2+y^2=M2^2z^2+R2^2 \quad \text{EQ. 2}$$

$$(x-x3)^2+(y-y3)^2=M3^2z^2-2M3^2z3z+M3^2z3^2+R3^2 \quad \text{EQ. 3}$$

Expand the left side:

$$x^2-2x1x+x1^2+y^2-2y1y+y1^2=M1^2z^2-2M1^2z1z+M1^2z1^2+R1^2 \quad \text{EQ. 4}$$

$$x^2+y^2=M2^2z^2+R2^2 \quad \text{EQ. 5}$$

$$x^2-2x3x+x3^2+y^2-2y3y+y3^2=M3^2z^2-2M3^2z3z+M3^2z3^2+R3^2 \quad \text{EQ. 6}$$

Subtract Equation 4 from 5 and Equation 6 from 5:

$$2x1x-x1^2+2y1y-y1^2=M2^2z^2+R2^2-M1^2z^2+2M1^2z1z-M1^2z1^2-R1^2$$

$$2x3x-x3^2+2y3y-y3^2=M2^2z^2+R2^2-M3^2z^2-2M3^2z3z-M3^2z3^2-R3^2$$

Collect and re-arrange terms:

$$2x1x-x1^2+2y1y-y1^2=(M2^2-M1^2)z^2+2M1^2z1z+R2^2-R1^2-M1^2z1^2$$

$$2x3x-x3^2+2y3y-y3^2=(M2^2-M3^2)z^2)+2M3^2z3z+R2^2-R3^2-M3^2z3^2$$

Collect and re-arrange terms some more:

$$2x1x+2y1y=(M2^2-M1^2)z^2+2M1^2z1z+R2^2-R1^2-M1^2z1^2+x1^2+y1^2$$

$$2x3x+2y3y=(M2^2-M3^2)z^2+2M3^2z3z+R2^2-R3^2-M3^2z3^2+x3^2+y3^2$$

Divide through by 2:

$$x1x+y1y=0.5(M2^2-M1^2)z^2+M1^2z1z+0.5(R2^2-R1^2-M1^2z1^2+x1^2+y1^2)$$

$$x3x+y3y=0.5(M2^2-M3^2)z^2+M3^2z3z+0.5(R2^2-R3^2-M3^2z3^2+x3^2+y3^2)$$

Make the following substitution:

$$a1=0.5(M2^2-M1^2)$$

$$b1=M1^2z1$$

$$c1=0.5(R2^2-R1^2-M1^2z1^2+x1^2+y1^2)$$

$$a3=0.5(M2^2-M3^2)$$

$$b3=M3^2z3$$

$$c3=0.5(R2^2-R3^2-M3^2z3^2+x3^2+y3^2)$$

$$x1x+y1y=a1z^2+b1z+c1$$

$$x3x+y3y=a3z^2+b3z+c3$$

Write the above two equations in matrix form:

$$\begin{vmatrix} x1 & y1 \\ x3 & y3 \end{vmatrix} * \begin{vmatrix} x \\ y \end{vmatrix} = \begin{vmatrix} a1z^2 + b1z + c1 \\ a3z^2 + b3z + c3 \end{vmatrix}$$

Compute the determinant of the normal matrix:

$D = x1y3 - x3y1$

If D is very small (to be defined later), then the cones lie on a straight line and the following derivation should be followed:

Rotate the cone vertices about the z axis by an angle theta such that they are all on the x axis. This lets us assume that y1 and y3 are zero.
This leads to the following simplification $x1x = a1z^2 + b1z + c1$ $x3x = a3z^2 + b3z + c3$ Divide through by x1 and x3

$x = (a1z^2 + b1z + c1)/x1$ $x = (a3z^2 + b3z + c3)/x3$

Set the two equations equal to each other $(a1z^2 + b1z + c1)/x1 = (a3z^2 + b3z + c3)/x3$ Multiply through by x1 and x3

$x3(a1z^2 + b1z + c1) = x1(a3z^2 + b3z + c3)$

Move the right side to the left $x3(a1z^2 + b1z + c1) - x1(a3z^2 + b3z + c3) = 0$ Multiply through $x3a1z^2 + x3b1z + x3c1 - x1a3z^2 - x1b3z - x1c3 = 0$ Collect terms $x3a1z^2 - x1a3z^2 + x3b1z - x1b3z + x3c1 - x1c3 = 0$ $(x3a1 - x1a3)z^2 + (x3b1 - x1b3)z + x3c1 - x1c3 = 0$ Make the following substitution $a = x3a1 - x1a3$ $b = x3b1 - x1b3$ $c = x3c1 - x1c3$ which yields:

$az^2 + bz + c = 0$ solve for z $z = (-b +/- \mathrm{sqrt}(b^2 - 4ac))/2a$ back substitute both values of z into either of these to get two possible values for x this will produce an x for each z meaning there will be two x-z pairs $x = (a1z^2 + b1z + c1)/x1$ $x = (a3z^2 + b3z + c3)/x3$ back substitute x and z from a pair into the following to get y (for each Y there is also a -Y solution)

$x^2 + y^2 = M2^2 z^2 + R2^2$     EQ. 5

$y^2 = M2^2 z^2 + R2^2 - x^2$ $y = \mathrm{sqrt}(M2^2 z^2 + R2^2 - x^2)$

Because there are two x-z pairs and each can produce two y values, there are 4 possible solutions. Apply a rotation of theta in the opposite direction to get each solution back in the original frame of reference.

If D is large (to be defined later), then the cones are not on a straight line and the following general derivation should be followed:

Note that the inverse of the normal matrix is given by:

$$\begin{vmatrix} x1 & y1 \\ x3 & y3 \end{vmatrix}^{-1} = \frac{1}{D} * \begin{vmatrix} y3 & -y1 \\ -x3 & x1 \end{vmatrix}$$

Solve x and y in terms of z:

$$\begin{vmatrix} x \\ y \end{vmatrix} = \frac{1}{D} * \begin{vmatrix} y3 & -y1 \\ -x3 & x1 \end{vmatrix} * \begin{vmatrix} a1z^2 + b1z + c1 \\ a3z^2 + b3z + c3 \end{vmatrix}$$

Expand out:

$$x = \frac{y3(a1z^2 + b1z + c1) - y1(a3z^2 + b3z + c3)}{D}$$

$$y = \frac{x1(a3z^2 + b3z + c3) - x3(a1z^2 + b1z + c1)}{D}$$

Expand some more:

$$x = \frac{y3a1z^2 + y3b1z + y3c1 - y1a3z^2 - y1b3z - y1c3}{D}$$

$$y = \frac{x1a3z^2 + x1b3z + x1c3 - x3a1z^2 - x3b1z - x3c1}{D}$$

Collect terms:

$$x = \frac{(y3a1 - y1a3)z^2 + (y3b1 - y1b3)z + y3c1 - y1c3}{D}$$

$$y = \frac{(x1a3 - x3a1)z^2 + (x1b3 - x3b1)z + x1c3 - x3c1}{D}$$

Make the following substitution:

$A1 = y3a1 - y1a3$     EQ. 7
$B1 = y3b1 - y1b3$
$C1 = y3c1 - y1c3$
$A3 = x1a3 - x3a1$
$B3 = x1b3 - x3b1$
$C3 = x1c3 - x3c1$ $$x = \frac{A1z^2 + B1z + C1}{D}$$     EQ. 8

$$y = \frac{A3z^2 + B3z + C3}{D}$$

Insert back into equation 2

$$\frac{(A1z^2+B1z+C1)(A1z^2+B1z+C1)+(A3z^2+B3z+C3)(A3z^2+B3z+C3)}{D^2}=M2^2z^2+R2^2$$

Expand:

$A1^2z^4+A1B1z^3+A1C1z^2+B1A1z^3+B1B1z^2+B1C1z+C1A1z^2+C1B1z+C1^2+A3^2z^4+A3B3z^3+A3C3z^2+B3A3z^3+B3B3z^2+B3C3z+C3A3z^2+C3B3z+C3^2-D^2M2^2z^2-D^2R2^2=0$

Collect terms:

$(A1^2+A3^2)z^4+2(A1B1+A3B3)z^3+(2A1C1+2A3C3+B1^2+B3^2-D^2M2^2)z^2+2(B1C1+B3C3)z+C1^2+C3^2-D^2R2^2=0$      EQ. 9

Find z using a quartic polynomial root finder and back substitute z into equations 7 and 8 to find x and y. A quartic polynomial is the largest polynomial that can be solved in a closed-form.

We also need a function $f(x, y, z)$ that we can use in an iterative solution:

Given the vertex x0, y0 and z0, the slope M and the radius at the vertex, R, define:

$(x-x0)^2+(y-y0)^2=(M(z-z0))^2+R^2$ $(x-x0)^2+(y-y0)^2-R^2=(M(z-z0))^2$ $\text{sqrt}((x-x0)^2+(y-y0)^2-R^2)=M(z-z0)$ $f=\text{sqrt}((x-x0)^2+(y-y0)^2-R^2)/M+z0-z$ define $a=x-x0$ define $b=y-y0$ define $Q=\text{sqrt}(a^2+b2-R^2)$;

$f=Q/M+z0-z$;

$df/dx=a/(M*Q)$; //Used Maxima to get partial derivatives $df/dy=b/(M*Q)$; //Used Maxima to get partial derivatives $df/dz=-1$;

In practice, there can be two solutions and we help convergence on the correct solution by specifying a Direction=+1 or −1 based on the slope $f=\text{Direction}*Q/M+z0-z$;

$df/dx=\text{Direction}*a/(M*Q)$;

$df/dy=\text{Direction}*b/(M*Q)$;

$df/dz=-1$;

Maxima program:

$f:\text{Direction}*(\text{sqrt}((x-vX)^2+(y-vY)^2-R*R))/M+vZ-z$;

$dfdx:\text{diff}(f,x)$;

$dfdy:\text{diff}(f,y)$;

$dfdz:\text{diff}(f,z)$;

With the 4S1P algorithm derived, it may be useful to consider the following derivation for the 2-station-2-point (or 2S2P) algorithm. Given equations for 2 vertical hyperbolic cones, find the equation for all intersection points x, y and z $(x_a-X_2)^2+(y_a-Y_2)^2=(M_2(z_a-Z_2))^2+R_2^2$ $(x_a-X_1)^2+(y_a-Y_1)^2=(M_1(z_a-Z_1))^2+R_1^2$ where $x_n$, $K_n$ and $Z_n$ specify the vertex position of cone n and where $M_n$ specifies the slope of cone n (delta horizontal/delta vertical)
and where $R_n$ specifies the radius of the vertex. If $R_n$ is zero, the cone simplifies to the traditional cone.

First, we simplify by moving the vertex of cone 1 to 0, 0, 0 and rotating so $X_2=0$. When the final answer is found, we need to do the reverse to get it moved back into the original frame of reference. This allows us to re-write the above equation in a simpler form (note: keep $Z_1$ even though it should be 0 because these equations can then be applied to cones 3 and 4, which are still to come):

$x_a^2+(y_a-Y_2)^2=(M_2(z_a-Z_2))^2+R_2^2$ $x_a^2+y_a^2=(M_1(z_a-Z_1))^2+R_1^2$

Note that $Y_2$ and $Z_2$ are not the same as $Y_2$ and $Z_2$ in the original equations.

Expand the right side:

$x_a^2+(y_a-Y_2)^2=M_2^2z_a^2-2M_2^2Z_2z_a+M_2^2Z_2^2+R_2^2$      EQ. 10

$x_a^2+y^2=M_1^2z_a^2-2M_1^2Z_1z_a+M_1^2Z_1^2+R_1^2$      EQ. 11

$x_a^2+y^2=M_1^2z_a^2+R_1^2$ (specific case of cone 1 being relocated to the origin)

Expand the left side:

$x_a^2+y_a^2-2Y_2y_a+Y_2^2=M_2^2z_a^2-2M_2^2Z_2z_a+M_2^2Z_2^2+R_2^2$      EQ. 12

$x_a^2+y_a^2=M_1^2z_a^2-2M_1^2Z_1z_a+M_1^2Z_1^2+R_1^2$      EQ. 13

Subtract equation 13 from 12

$-2Y_2y_a+Y_2^2=M_2^2z_a^2-2M_2^2Z_2z_a+M_2^2Z_2^2+R_2^2M_1^2z_a^2+2M_1^2Z_1z_a-M_1^2Z_1^2-R_1^2$

Collect and re-arrange terms:

$-2Y_2y_a=M_2^2z_a^2-2M_2^2Z_2z_a+M_2^2Z_2^2+R_2^2-M_1^2z_a^2+2M_1^2Z_1z_a-M_1^2Z_1^2-R_1^2-Y_2^2$ $-2Y_2y_a=M_2^2z_a^2-M_1^2z_a^2+2M_1^2Z_1z_a-2M_2^2Z_2z_a+M_2^2Z_2^2+R_2^2-M_1^2Z_1^2-R_1^2-Y_2^2$ $-y_a=(M_2^2-M_1^2)z_a^2+2(M_1^2Z_1-M_2^2Z_2)z_a+M_2^2Z_2^2-M_1^2Z_1^2+R_2^2-R_1^2-Y_2^2)/2Y_2$ $ya=(M_1^2-M_2^2)z_a^2+2(M_2^2Z_2-M_1^2Z_1)z_a+M_1^2Z_1^2-M_2^2Z_2^2+R_1^2-R_2^2+Y_2^2)/2Y_2$      EQ. 14

Solve for x:

$x_a=+/-\text{sqrt}(M_1^2z_a^2+R_1^2-y_a^2)$      EQ. 15

Note that x is symmetrical about the y axis which is to say that the polarity of the +/− sign determines if x is on the left/negative side of y or the right/positive side of y. Practically speaking, this means that as we vary z and compute x and y, we must consider both cases of x.

Figure 9:
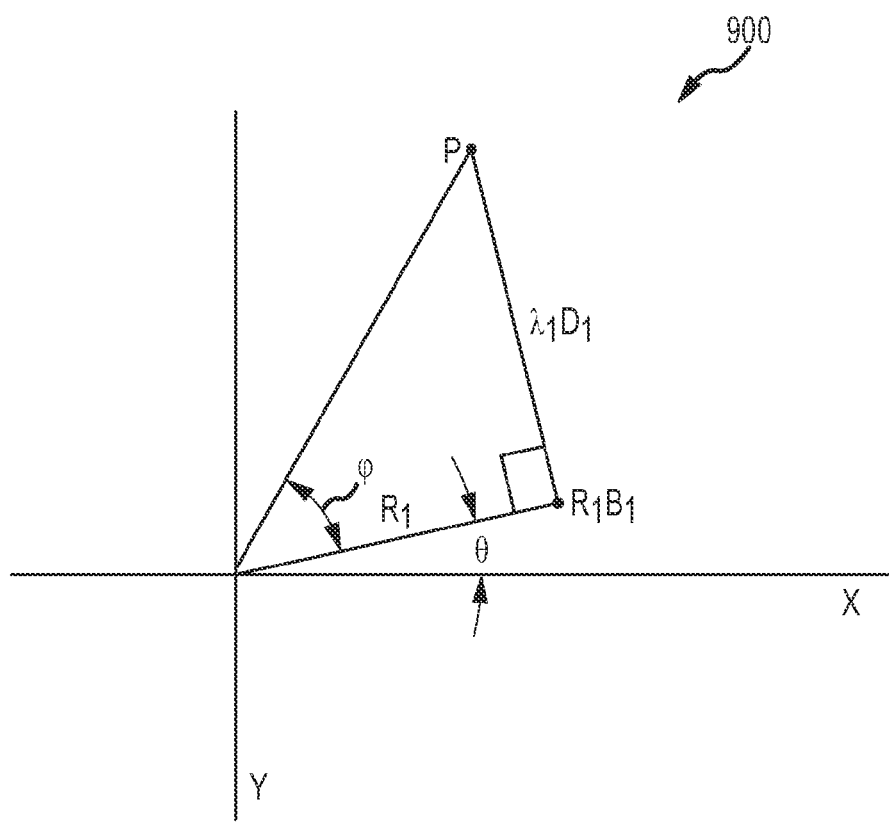
FIG. 9 is a graph useful for deriving the 2S2P algorithm.

Now consider the reverse case where x and y are given and we want to compute z:

$z_a=J_1\text{sqrt}(x_a^2+y_a^2-R_1^2)/M_1$      EQ. 16a $z_a=J_2\text{sqrt}(x_a^2+(y_a-Y_2)^2-R_2^2)/M_2+Z_2$      EQ. 16b Where $J_1$ is +1 if cone 1 is an upward cone and −1 if cone 1 is a downward cone Where $J_2$ is +1 if cone 2 is an upward cone and −1 if cone 2 is a downward cone Note: upward and downward are defined by what is realistic with the physics Switching gears for a minute, consider the graph 900 of FIG. 9, where $P_a$ represents the same $x_a$, $y_a$ being solved for in equations 14 and 15 above, $R_1$ is the same radius of cone 1, $D_1$ is a 2D direction vector at right angles to $R_1B_1$, $\lambda_1$ is a scalar representing the distance from $R_1B_1$ to $P_a$, and $B_1$ is a 2×2 rotation matrix for counter clockwise rotation of $\theta_1$ about the Z axis.

$$\begin{vmatrix} \cos\theta_1 & -\sin\theta_1 \\ \sin\theta_1 & \cos\theta_1 \end{vmatrix}$$

If vector $R_1B_1$ before rotation by $\theta_1$ is initially at $$\begin{vmatrix} R_1 \\ 0 \end{vmatrix}$$

Then $$R_1B_1 = \begin{vmatrix} \cos\theta_1 & -\sin\theta_1 \\ \sin\theta_1 & \cos\theta_1 \end{vmatrix} * \begin{vmatrix} R_1 \\ 0 \end{vmatrix} = R_1 * \begin{vmatrix} \cos\theta_1 \\ \sin\theta_1 \end{vmatrix}$$

If we apply a 90 degree CCW rotation to $R_1$ $$D_1 = \begin{vmatrix} 0 & -1 \\ 1 & 0 \end{vmatrix} * \begin{vmatrix} \cos\theta_1 & -\sin\theta_1 \\ \sin\theta_1 & \cos\theta_1 \end{vmatrix} = \begin{vmatrix} -\sin\theta_1 \\ \cos\theta_1 \end{vmatrix} \qquad \text{EQ. 17}$$

$$\lambda_1 D_1 = \lambda_1 * \begin{vmatrix} -\sin\theta_1 \\ \cos\theta_1 \end{vmatrix}$$

$$P_a = R_1B_1 + \lambda_1 D_1$$

$$x_a = R_1\cos\theta_1 - \lambda_1\sin\theta_1$$

$$y_a = R_1\sin\theta_1 + \lambda_1\cos\theta_1$$

$$-(x_a - R_1\cos\theta_1)/\sin\theta_1 = \lambda_1$$

$$(y_a - R_1\sin\theta_1)/\cos\theta_1 = \lambda_1$$

$$-(x_a - R_1\cos\theta_1)/\sin\theta_1 = (y_a - R_1\sin\theta_1)/\cos\theta_1$$

$$-\cos\theta_1(x_a - R_1\cos\theta_1) = \sin\theta_1(y_a - R_1\sin\theta_1)$$

$$-x_a\cos\theta_1 + R_1\cos^2\theta_1 = y_a\sin\theta_1 - R_1\sin^2\theta_1$$

$$R_1\cos^2\theta_1 + R_1\sin^2\theta_1 = x_a\cos\theta_1 + y_a\sin\theta_1$$

$$R_1 = x_a\cos\theta_1 + y_a\sin\theta_1$$

A similar equation exists for the number 2 cone which is simply offset by $Y_2$ $$P_a = R_2B_2 + \lambda_2D_2$$

$$x_a = R_2\cos\theta_2 - \lambda_2\sin\theta_2$$

$$y_a = R_2\sin\theta_2 + \lambda_2\cos\theta_2 + Y_2$$

$$R_2 = x_a\cos\theta_2 + (y_a - Y_2)\sin\theta_2 \qquad \text{EQ. 18}$$

If $\theta_1$ and $\theta_2$ are known, then it becomes possible to compute $x_a$ and $y_a$:

$$R_1\cos\theta_2 x_a \cos\theta_1\cos\theta_2 + y_a\sin\theta_1\cos\theta_2$$

$$R_2\cos\theta_1 = x_a\cos\theta_1\cos\theta_2 + (y_a - Y_2)\cos\theta_1\sin\theta_2$$

$$R_1\cos\theta_2 - R_2\cos\theta_1 = y_a\sin\theta_1\cos\theta_2 + (Y_2 - y_a)\cos\theta_1\sin\theta_2$$

$$R_1\cos\theta_2 - R_2\cos\theta_1 = y_a\sin\theta_1\cos\theta_2 + Y_2\cos\theta_1\sin\theta_2 - y\cos\theta_1\sin\theta_2$$

$$R_1\cos\theta_2 - R_2\cos\theta_1 - Y_2\cos\theta_1\sin\theta_2 = y_a(\sin\theta_1\cos\theta_2 - \cos\theta_1\sin\theta_2)$$

$$y_a = (R_1\cos\theta_2 - R_2\cos\theta_1 - Y_2\cos\theta_1\sin\theta_2)/(\sin\theta_1\cos\theta_2 - \cos\theta_1\sin\theta_2) \qquad \text{EQ. 19}$$

$$R_1\sin\theta_2 = x_a\cos\theta_1\sin\theta_2 + y_a\sin\theta_1\sin\theta_2$$

$$R_2\sin\theta_1 = x_a\sin\theta_1\cos\theta_2 + (y_a - Y_2)\sin\theta_1\sin\theta_2$$

$$R_1\sin\theta_2 - R_2\sin\theta_1 = x_a(\cos\theta_1\sin\theta_2 - \sin\theta_1\cos\theta_2) + Y_2\sin\theta_1\sin\theta_2$$

$$R_1\sin\theta_2 - R_2\sin\theta_1 - Y_2\sin\theta_1\sin\theta_2 = x_a(\cos\theta_1\sin\theta_2 - \sin\theta_1\cos\theta_2)$$

$$x_a = (R_1\sin\theta_2 - R_2\sin\theta_1 - Y_2\sin\theta_1\sin\theta_2)/(\cos\theta_1\sin\theta_2 - \sin\theta_1\cos\theta_2) \qquad \text{EQ. 20}$$

Although we could determine $\theta_1$ and $\theta_2$ by introducing the identity $\sin^2\theta_1 + \cos^2\theta_1 = 1$, a more straight forward approach exists which deals with the ambiguities better:

The magnitude of $P = \text{sqrt}(x_a^2 + y_a^2)$ therefore $$\varphi_1 = \cos^{-1}(R_1, \text{sqrt}(x_a^2 + y_a^2))$$

$$\theta_1 = \tan^{-1}(y_a, x_a) +/- \cos^{-1}(R_1, \text{sqrt}(x_a^2 + y_a^2))$$

The +/− comes about because FIG. 1 can be drawn in a right-handed manner as shown or in a left-handed manner (not shown).

Therefore, we need to introduce additional constants, $K_1$ and $K_2$ which are either +1 for left-handed situations or −1 for right-handed ones.

$$\theta_1 = \tan^{-1}(y_a, x_a) + K_1\cos^{-1}(R_1, \text{sqrt}(x_a^2 + y_a^2)) \qquad \text{EQ. 21}$$

$$\theta_2 = \tan^{-1}((y_a - Y_2), x_a) + K_2\cos^{-1}(R_2, \text{sqrt}(x_a^2 + (y_a - Y_2)^2)) \qquad \text{EQ. 22}$$

A significant problem with Equations 19 and 20 is that the intersection point, x and y, can be non-realistic. In other words, the intersection can occur behind a camera. So far in this paper, the only things that hint of the notion of an intersection occurring in front or behind the camera are the K constants that define the hand sense (left- or right-handed). If we go back to the equation:

$$D_1 = \begin{vmatrix} 0 & -1 \\ 1 & 0 \end{vmatrix} * \begin{vmatrix} \cos\theta_1 & -\sin\theta_1 \\ \sin\theta_1 & \cos\theta_1 \end{vmatrix}$$

Remember that this was for the right-handed case where $K_1$ is −1. For the left-handed situation where $K_1$ is +1, it can be shown that the 90 degree CCW rotation matrix must be changed to a 90 degree CW rotation:

$$D_1 = \begin{vmatrix} 0 & 1 \\ -1 & 0 \end{vmatrix} * \begin{vmatrix} \cos\theta_1 & -\sin\theta_1 \\ \sin\theta_1 & \cos\theta_1 \end{vmatrix}$$

By substituting $K_1$, we can re-write the equation so the hand sense is built into the equation:

$$D_1 = \begin{vmatrix} 0 & K_1 \\ -K_1 & 0 \end{vmatrix} * \begin{vmatrix} \cos\theta_1 & -\sin\theta_1 \\ \sin\theta_1 & \cos\theta_1 \end{vmatrix}$$

Which leads to:

$$D_1 = \begin{vmatrix} K_1 \sin\theta_1 \\ -K_1 \cos\theta_1 \end{vmatrix}$$

Recall that $$P_a = R_1 B_1 + \lambda_1 D_1$$

For solutions where the intersection is in front of the camera, $\lambda_1$ must be positive. If we rearrange a bit:

$$P_a - R_1 B_1 = \lambda_1 D_1$$

$$D_1 \cdot (P_a - R_1 B_1) = \lambda_1 D_1 \cdot D_1$$

Where · is the dot product operator

Continuing:

$$(D_1 \cdot (P_a - R_1 B_1))/(D_1 \cdot D_1) = \lambda_1$$

Note that any vector dotted with itself is always positive and also that $D_1$ is already of unit length. Therefore:

$$D_1 \cdot (P_a - R_1 B_1) = \lambda_1$$

The significant thing here is that when $\lambda_1$ is positive, we have a realistic solution and can use the x and y from Equations 19 and 20 but when it's negative, x and y are undefined.

Now we introduce two additional cones; cone 3 shares the same horizontal position as cone 1 and cone 4 shares the same horizontal position as cone 2 but they do not share the same vertical positions, slopes and radii:

$$x_b^2 + (y_b - Y_2)^2 = (M_4(z_b - Z_4))^2 + R_4^2 \quad \text{EQ. 23}$$

$$x_b^2 + y_b^2 = (M_3(z_b - Z_3))^2 + R_3^2 \quad \text{EQ. 24}$$

Similarly, there are two new angles, $\theta_3$ and $\theta_4$, associated with $x_b$ and $y_b$ $$R_3 = x_b \cos\theta_3 + y_b \sin\theta_3$$

$$R_4 = x_b \cos\theta_4 + (y_b - Y_2)\sin\theta_4$$

However, $\theta_3$ and $\theta_4$ can be known from $\theta_1$ and $\theta_2$ because there is a fixed relationship between them. Therefore, we'll define new constants, $\beta_1$ and $\beta_2$, to represent the constant angle differences:

$$\theta_3 = \theta_1 + \beta_1 \quad \text{EQ. 23}$$

$$\theta_4 = \theta_2 + \beta_2 \quad \text{EQ. 24}$$

This allows us to use a modified version of Equations 19 and 20

$$y_b = (R_3 \cos\theta_4 - R_4 \cos\theta_3 - Y_2 \cos\theta_3 \sin\theta_4)/(\sin\theta_3 \cos\theta_4 - \cos\theta_3 \sin\theta_4) \quad \text{EQ. 25}$$

$$x_b = (R_3 \sin\theta_4 - R_4 \sin\theta_3 - Y_2 \sin\theta_3 \sin\theta_4)/(\cos\theta_3 \sin\theta_4 - \sin\theta_3 \cos\theta_4) \quad \text{EQ. 26}$$

Note: $x_b$ and $y_b$ may be created in the opposite direction than the solution we are searching for. This is because the vector from cone 4 to point B and/or the vector from cone 3 to point B may intersect behind a camera instead of in front. The same validation technique described earlier regarding equations 19 and 20 can also be applied to equations 25 and 26 to determine if the intersection point is realistic.

Using $x_b$ and $y_b$, we solve for $z_b$ as follows $$z_b = J_3 \text{sqrt}(x_b^2 + y_b^2 - R_3^2)/M_3 + Z_3 \quad \text{EQ. 27a}$$

$$z_b = J_4 \text{sqrt}(x_b^2 + (y_b - Y_2)^2 - R_4^2)/M_4 + Z_4 \quad \text{EQ. 27b}$$

Once again, $J_3$ and $J_4$ are chosen so that the solution is realistic with the physics.

One way to look at this is that $z_b$ from Equation 27a is the z location of cone 3 at $x_b$ and $y_b$ and $z_b$ from Equation 27b is the z location of cone 4 at $x_b$ and $y_b$. Therefore, the solution we seek is when both $z_b$'s are equal. This can be expressed as:

$$J_3 \text{sqrt}(x_b^2 + y_b^2 - R_3^2)/M_3 + Z_3 = J_4 \text{sqrt}(x_b^2 + (y_b - Y_2)^2 - R_4^2)/M_4 + Z_4 \quad \text{EQ. 28a}$$

$$J_3 \text{sqrt}(x_b^2 + y_b^2 - R_3^2)/M_3 + Z_3 - J_4 \text{sqrt}(x_b^2 + (y_b - Y_2)^2 - R_4^2)/M_4 - Z_4 = 0 \quad \text{EQ. 28b}$$

Looking forward to the final solution, we must determine bounds for $z_a$, then use a binary search to make equation 28 true.

The first part of determining the bounds for $z_a$ is to consider the values of $J_1$ and $J_2$. If $J_1$ is +1, then z must be greater than 0 and less than +infinity. If $J_1$ is −1, then z must be less than 0 and greater than −infinity. Practically speaking, infinity can be thought of as something more like 50-100 meters. For the other cone, if $J_2$ is +1, then z must be greater than $Y_2$ and less than +infinity. If $J_2$ is −1, then z must be less than $Y_2$ and greater than −infinity.

The second part of determining the bounds for $z_a$ is to consider values that make Equation 15 realistic. Recall that Equation 15 is:

$$x_a = +/- \text{sqrt}(M_1^2 z_a^2 + R_1^2 - y_a^2)$$

For Equation 15 to be realistic $$M_1^2 z_a^2 + R_1^2 - y_a^2 >= 0 \quad \text{EQ. 29a}$$

$$y_a^2 - M_1^2 z_a^2 - R_1^2 <= 0 \quad \text{EQ. 29b}$$

Let's define $\Lambda = y_a^2 - M_1^2 z_a^2 - R_1^2 <= 0$ $$x_a = +/- \text{sqrt}(-\Lambda)$$

The values of $z_a$ at the boundaries between realistic and non-realistic are therefore $$\Lambda = y_a^2 - M_1^2 z_a^2 - R_1^2 = 0$$

Recall that Equation 14 is:

$$ya = (M_1^2 - M_2^2)z_a^2 + 2(M_2^2 Z_2 - M_1^2 Z_1)z_a + M_1^2 Z_1^2 - M_2^2 Z_2^2 + R_1^2 - R_2^2 + Y_2^2)/2Y_2$$

Make the following substitutions:

$$E_a = (M_1^2 - M_2^2)/2Y_2$$

$$F_a = (M_2^2 Z_2 - M_1^2 Z_1)/Y_2$$

$$G_a = (M_1^2 Z_1^2 - M_2^2 Z_2^2 + R_1^2 - R_2^2 + Y_2^2)/2Y_2$$

$$y_a = E_a z_a^2 + F_a z_a + G_a$$

$$y_a^2 = E_a^2 z_a^4 + E_a F_a z_a^3 + E_a G_a z_a^2 + F_a E_a z_a^3 + F_a^2 z_a^2 + F_a G_a z_a + G_a E_a z_a^2 + G_a F_a z_a + G_a^2$$

$$y_a^2 = E_a^2 z_a^4 + E_a F_a z_a^3 + E_a G_a z_a^2 + E_a F_a z_a^3 + F_a^2 z_a^2 + F_a G_a z_a + E_a G_a z_a^2 + F_a G_a z_a + G_a^2$$

$$y_a^2 = E_a^2 z_a^4 + 2E_a F_a z_a^3 + (2E_a G_a + F_a^2) z_a^2 + 2 F_a G_a z_a + G_a^2$$

Recall that . . .

$$x_a^2 + y^2 = M_1^2 z_a^2 + R_1^2 \text{ (specific case of cone 1 being relocated to the origin)}$$

$$x_a^2 + y^2 - M_1^2 z_a^2 - R_1^2 = 0$$

Setting x to 0, we can solve for all z values. These z values are the boundary conditions we're after:

$$y^2 - M_1^2 z_a^2 - R_1^2 = 0$$

$$E_a^2 z_a^4 + 2E_a F_a z_a^3 + (2E_a G_a + F_a^2 - M_1^2) z_a^2 + 2F_a G_a z_a + G_a^2 - R_1^2 = 0 \quad \text{EQ. 30}$$

There are 4 potential roots of Equation 30. Search ranges can be identified by picking a value between adjacent roots and testing to see if Equation 29 is true at that value. If true, the two roots define a viable search range.

The third part of determining the bounds for $z_a$ is to combine parts 1 and 2 so that bounds are found that satisfy both parts. If no such bounds can be found, then there is no solution. If bounds can be found, then a binary search may be conducted to make Equation 28 true. The tricky part is that Equations 25 and 26 can produce non-realistic or undefined values of $x_b$ and $y_b$. Therefore, Equation 28 can be undefined over some sub-ranges within the search range. A global search should be conducted before the binary search to identify smaller search ranges in which Equations 25 and 26 are defined over the smaller search range. Then a binary search can be conducted over the smaller search range.

I claim:

1. A method for processing data from a camera-based device with improved initial azimuth accuracy, comprising:
   providing a dataset comprising digital images captured by a camera, position information for the camera when each of the digital images was captured, and tilt information for the camera when each of the digital images was captured;
   generating a plurality of potential positions for tie-points for the dataset;
   performing arbitration to select a most-likely tie-point position from the plurality of potential tie-point positions associated with an initial tie-point;
   generating a plurality of additional tie-points based on the most-likely tie-point position of the initial tie-point and an initial azimuth of the camera provided by the initial tie-point; and
   performing bundle adjustment on the dataset using the initial tie-point and the plurality of additional tie-points.

2. The method of claim 1, wherein subsets of the digital images are captured at two or more differing locations in a physical environment.

3. The method of claim 2, wherein the digital images are captured at four differing locations in the physical environment, wherein the method further comprises receiving a manually or automatically generated tie-point and wherein the generating of the plurality of potential positions for the tie-points includes, with the manually or automatically generated tie-point as input, applying a four-station-one-tie-point algorithm to the dataset to generate a first subset of the plurality of potential positions for the tie-points.

4. The method of claim 3, further comprising:
   identifying four cameras that observe the manually or automatically generated tie-point;
   with an initial pose for each of the four cameras, computing lens position and a direction vector for an observation of the tie-point in a world frame; and
   creating a hyperbolic cone based on the lens position and the direction vector for each of the four cameras.

5. The method of claim 4, where the first subset of the plurality of potential positions for the tie-points is determined by finding intersections of the hyperbolic cones.

6. The method of claim 3, wherein the digital images are captured at two differing locations in the physical environment, wherein the method further comprises receiving two manually or automatically generated tie-points, and wherein the generating of the plurality of potential positions for the tie-points includes, with the two manually or automatically generated tie-points as input, applying a two-station-two-tie-point algorithm to the dataset to generate a second subset of the plurality of potential positions for the tie-points.

7. The method of claim 6, further comprising:
   identifying two cameras at two different ones of the locations of the physical environment that were used to capture the digital images that both observe the two manually or automatically generated tie-points;
   with an initial pose for each of the two cameras, computing lens position and a direction vector for an observation of the tie-point in a world frame; and
   creating a hyperbolic cone based on the lens position and the direction vector for each of the two cameras.

8. The method of claim 4, where the second subset of the plurality of potential positions for the tie-points is determined by finding intersections of the hyperbolic cones associated with the two cameras.

9. The method of claim 1, wherein the most-likely tie-point position is a tie-point position that produces an azimuth that most closely matches an azimuth provided by data from a compass sensor associated with the camera.

10. A photogrammetry method, comprising:
    positioning a device with two or more cameras, a position sensor, and a tilt sensor at a plurality of differing locations;
    operating the device to capture at each of the locations a dataset including digital images, position data, and tilt data;
    applying a four-station-one-tie-point algorithm to the dataset to generate a first list of potential tie-point positions each associated with a tie-point for the dataset;
    applying a two-station-one-tie-point algorithm to the dataset to generate a second list of potential tie-point positions each associated with a tie-point for the dataset; and
    processing the first and second lists of potential tie-point positions to select a tie-point at a most-likely reliable tie-point position.

11. The method of claim 10, wherein the first list of potential tie-point positions correspond with intersections of hyperbolic cones generated from portions of the dataset captured at four of the differing locations.

12. The method of claim 11, wherein the four of the differing locations are selected as all providing observations of a tie-point.

13. The method of claim 10, wherein the second list of potential tie-point positions correspond with intersections of hyperbolic cones generated from portions of the dataset captured at two of the differing locations.

14. The method of claim 13, wherein the two of the differing locations are selected as both providing observations of a pair of tie-points.

15. The method of claim 10, further comprising computing initial azimuth values for each of the cameras at each of the differing locations based on the selected tie-point and initiating a bundle adjustment on the dataset based on the selected tie-point and the computed initial azimuth values.

16. A system for processing geodata from camera-based devices to determine initial azimuth, comprising:
   a camera-based device comprising at least one camera operable to capture digital images of a physical environment from two or more locations in the physical environment, wherein the camera-based device further includes position and tilt sensors capturing position and tilt information for the camera-based device concurrently with operation of the camera to capture the digital images; and
   a server providing a geodata analysis module to first process the captured digital images and the position and tilt information in combination with a manually or automatically generated tie-point to generate a plurality of potential tie-point positions, to second determine a most-likely tie point from the plurality of potential tie-point positions, and to provide a bundle adjustment of data gathered by the camera-based device using the most-likely tie point and an initial azimuth for the camera associated with the most-likely tie point.

17. The system of claim 16, wherein the geodata analysis module comprises a four-station-one-tie-point algorithm generating hyperbolic cones using the manually or automatically generated tie-point and four cameras from which the manually or automatically generated tie-point is observable from different ones of the locations and wherein the plurality of potential tie-point positions correspond with intersections of the hyperbolic cones.

18. The system of claim 16, wherein the geodata analysis module comprises a two-station-two-tie-point algorithm generating hyperbolic cones using the manually or automatically generated tie-point, an additional manually or automatically generated tie-point, and two cameras from which both of the generated tie-points are observable from two different ones of the locations and wherein the plurality of potential tie-point position correspond with intersections of the hyperbolic cones.

19. The system of claim 16, wherein the camera-based device comprises a survey instrument with a plurality of cameras that are concurrently operable to capture with the digital images a 360-degree panoramic view of the physical environment.

20. The system of claim 19, wherein an initial azimuth is determined for each of the plurality of cameras by the geodata analysis module for use as input for the bundle adjustment.

* * * * *